United States Patent
Nishiike et al.

(10) Patent No.: US 8,215,690 B2
(45) Date of Patent: Jul. 10, 2012

(54) PICK-UP STYLE UTILITY VEHICLE WITH EXPANDABLE CARGO BED

(75) Inventors: Masashi Nishiike, Akashi (JP); Itsuo Takegami, Kobe (JP); Masashi Sakata, Kobe (JP); Takafumi Hisamori, Kobe (JP); Tooru Ogino, Kobe (JP); Kazuma Waida, Kobe (JP); Dustin Meyer, Lincoln, NE (US); Eizou Sakai, Akashi (JP); Shigeru Yamashita, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 338 days.

(21) Appl. No.: 12/646,106

(22) Filed: Dec. 23, 2009

(65) Prior Publication Data

US 2011/0148145 A1 Jun. 23, 2011

(51) Int. Cl.
*B62D 33/08* (2006.01)
(52) U.S. Cl. .................. 296/24.43; 296/186.4
(58) Field of Classification Search .............. 296/24.43, 296/24.4, 26.08, 26.1, 26.11, 65.04, 69, 186.4, 296/190.11, 65.05; 160/368.1
See application file for complete search history.

(56) References Cited

U.S. PATENT DOCUMENTS

| | | | | |
|---|---|---|---|---|
| 4,480,868 A * | 11/1984 | Koto | | 296/190.11 |
| 5,934,727 A * | 8/1999 | Storc et al. | | 296/26.11 |
| 6,398,291 B1 * | 6/2002 | Reusswig et al. | | 296/186.4 |
| 6,435,596 B1 * | 8/2002 | Pyo | | 296/106 |
| 6,447,039 B1 * | 9/2002 | Song | | 296/37.6 |
| 6,450,566 B1 * | 9/2002 | Hong | | 296/190.11 |
| 6,478,355 B1 * | 11/2002 | Van Eden et al. | | 296/37.6 |
| 6,513,863 B1 * | 2/2003 | Renke et al. | | 296/190.11 |
| 6,899,367 B1 * | 5/2005 | Plavetich et al. | | 296/65.13 |
| 6,899,378 B2 * | 5/2005 | Rhodes et al. | | 296/183.1 |
| 6,905,159 B1 | 6/2005 | Saito et al. | | |
| 6,959,960 B2 * | 11/2005 | Buccinna et al. | | 296/190.11 |
| 6,994,388 B2 | 2/2006 | Saito et al. | | |
| 7,093,871 B2 * | 8/2006 | Lim et al. | | 296/26.08 |
| 7,249,798 B2 | 7/2007 | Saito et al. | | |
| 7,762,621 B2 * | 7/2010 | Duller | | 296/190.11 |

* cited by examiner

*Primary Examiner* — H Gutman
(74) *Attorney, Agent, or Firm* — Wenderoth, Lind & Ponack, LLP

(57) ABSTRACT

A pick-up style utility vehicle including a front seat, a rear seat and a cargo bed in order from the front side to the rear side of the vehicle, and a screen for partitioning the cargo bed and ride space on the front side of the cargo bed. The cargo bed has at least a stationary bottom plate and an expansion bottom plate, and is changeable between an expanded state where the cargo bed is expanded forward into the ride space and a non-expanded state where the cargo bed does not occupy the ride space. Also, the expansion bottom plate is pivotable on a horizontal shaft in the right and left direction relative to the stationary bottom plate and the screen.

8 Claims, 20 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle with a cargo bed which is expandable forward for making the most of space for the cargo bed and ride space according to needs of a user.

2. Description of the Related Art

In general, a pick-up style utility vehicle is provided with a relatively large cargo bed in a rear section of a seat in comparison to a handlebar style utility vehicle belonging to an all terrain vehicle. Therefore, the pick-up style utility vehicle is used in wider practical fields of uses such as transport in golf links, maintenance of the golf links, hunting and conveyance of wood materials in comparison to the handlebar style utility vehicle.

The applicant previously filed applications for inventions relating to a pick-up style utility vehicle with an expandable cargo bed, and those applications were registered. For example, the inventions include U.S. Pat. No. 6,905,159, U.S. Pat. No. 6,994,388, and U.S. Pat. No. 7,249,798.

FIG. 21 shows a pick-up style utility vehicle 901 as shown in the patent literatures described above. The pick-up style utility vehicle 901 is provided with a front seat 902, a rear seat 903, and a cargo bed CN. The cargo bed CN includes a stationary bottom plate 907 and a plate portion 904 arranged on the stationary bottom plate 907. The pick-up style utility vehicle 901 is switchable between a non-expanded state in which the vehicle is used as a four-seater vehicle and an expanded state in which the vehicle is used as a two-seater vehicle with an expanded cargo bed. A screen 905 is arranged on the stationary bottom plate 907 between the plate portion 904 and the rear seat 903.

FIG. 22 is a side view showing the pick-up style utility vehicle 901 in the non-expanded state. In the non-expanded state, passengers can sit in both the front seat 902 and the rear seat 903. The rear seat 903 is supported pivotably on a horizontal shaft 935 provided in a front end of the rear seat 903. FIG. 22 shows the rear seat 903 at a use position P1 and the cargo bed CN in the non-expanded state. The "rear seat 903 at the use position P1" indicates the seat 903 placed on the stationary bottom plate 907.

FIG. 23 is a side view showing the pick-up style utility vehicle 901 in the expanded state. In the expanded state, the rear seat 903 is at a shunting position P2. The rear seat 903 at the shunting position P2 stands up on the front side of the stationary bottom plate 907. Therefore, the passengers cannot sit in the rear seat 903 at the shunting position P2. Meanwhile, since the rear seat 903 is shunted to the front side of the stationary bottom plate 907, the entire face of the stationary bottom plate 907 is cleared. Therefore, a cargo bed CE in the expanded state is extended more than the cargo bed CN in the non-expanded state.

The non-expanded state is changed to the expanded state as follows. Firstly, the rear seat 903 pivotable on the horizontal shaft 935 is folded down forward from the use position P1 to the shunting position P2. Then, in accordance with the positional change of the rear seat 903, a position of the screen 905 is changed to the front side. As a result, a front part of the stationary bottom plate 907 is also cleared. Therefore, the entire face of the stationary bottom plate 907 is usable as a bottom face of the cargo bed. Expansion side plates 943 accommodated in the plate portion 904 are developed to the front side. In such a way, the cargo bed CE in the expanded state is formed.

FIG. 20 shows an example of the screen 905. The screen 905 is formed of a steel frame and wire mesh. Therefore, the screen 905 is a heavy member. The screen 905 is supported on a chassis by inserting protruding portions 905a, 905a of the screen 905 into attachment holes arranged in both ends of the chassis in the right and left direction. That is, there is a need for lifting the screen 905 up in order to move the screen 905. Therefore, the positional change of the screen 905 requires two persons and is not easily performed by one person.

SUMMARY OF THE INVENTION

The present invention is achieved in consideration of the problem above, and an object of the invention is to enable one person to easily move a screen in accordance with a change of a cargo bed.

A first aspect of the invention is a pick-up style utility vehicle, including a front seat, a rear seat, and a cargo bed in order from the front side to the rear side, and a screen for partitioning the cargo bed and ride space on the front side of the cargo bed, in which the cargo bed has at least a stationary bottom plate and an expansion bottom plate, and is changeable between an expanded state where the cargo bed is expanded forward into the ride space and a non-expanded state where the cargo bed does not occupy the ride space, and the expansion bottom plate is pivotable on a horizontal shaft in the right and left direction relative to the stationary bottom plate and the screen.

According to the first aspect, a passenger pivots the expansion bottom plate and the screen upon switching between the non-expanded state and the expanded state, so that the screen can be moved. Since there is no need for the passenger to lift the screen up, the screen is easily movable by even one passenger.

Configurations (1) to (7) may be preferably adapted for the pick-up style utility vehicle of the first aspect.

In configuration (1), a rear support stand arranged on the front side of the stationary bottom plate for supporting the rear seat is provided, and the rear support stand is adapted to support the expansion bottom plate in the expanded state.

In configuration (2), a backrest of the rear seat fixed to the expansion bottom plate is provided, and the rear support stand is adapted to store the expansion bottom plate and the backrest in the expanded state.

In configuration (3), the rear seat is supported on the expansion bottom plate.

In configuration (4), an expansion side plate is supported pivotably on a vertical shaft relative to the screen for expanding a side plate of the cargo bed in the expanded state.

In configuration (5), a fixing mechanism capable of fixing the screen in the non-expanded state and the expansion side plate in the expanded state to the cargo bed is provided.

In configuration (6), a fixing mechanism for a shaft capable of fixing the screen to the expansion bottom plate by connecting the expansion bottom plate and the screen in both the non-expanded state and the expanded state is provided.

In configuration (7), an expansion side plate provided on the lower side of the rear seat in the non-expanded state pivotably on a horizontal shaft in the back and forth direction for expanding a side plate of the cargo bed in the expanded state is provided.

A second aspect of the invention is a pick-up style utility vehicle changeable between a non-expanded state where both a front seat and a rear seat are used for ride and an expanded state where a cargo bed is expanded into the ride space in the rear seat, including a screen for closing the front side of the cargo bed, a stationary bottom plate serving as a bottom face of the cargo bed in the non-expanded state, and an expansion bottom plate serving as the bottom face of the cargo bed in the expanded state together with the stationary bottom plate and also serving as a screen for closing the front side of the cargo bed in the non-expanded state together with the screen, in which the expansion bottom plate is pivotable on a horizontal shaft in the right and left direction relative to the expansion bottom plate, and the screen is pivotable on a horizontal shaft in the right and left direction relative to the expansion bottom plate.

DETAILED DESCRIPTION OF THE PREFERRED EMBODIMENTS

First Embodiment

Figure 3:
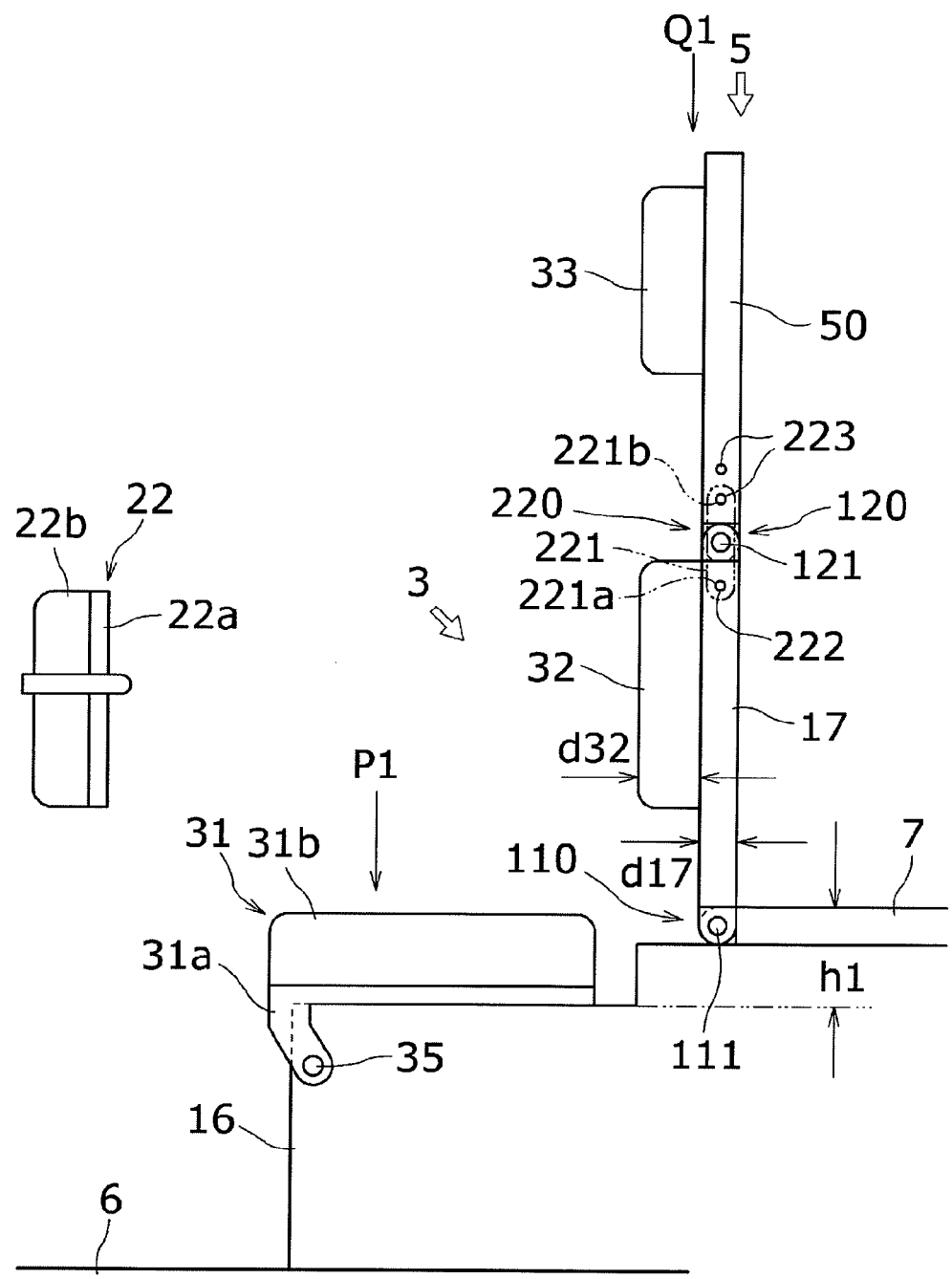
FIG. 3 is a side view showing posture of a screen assembly in the non-expanded state (the first embodiment)
Figure 4:
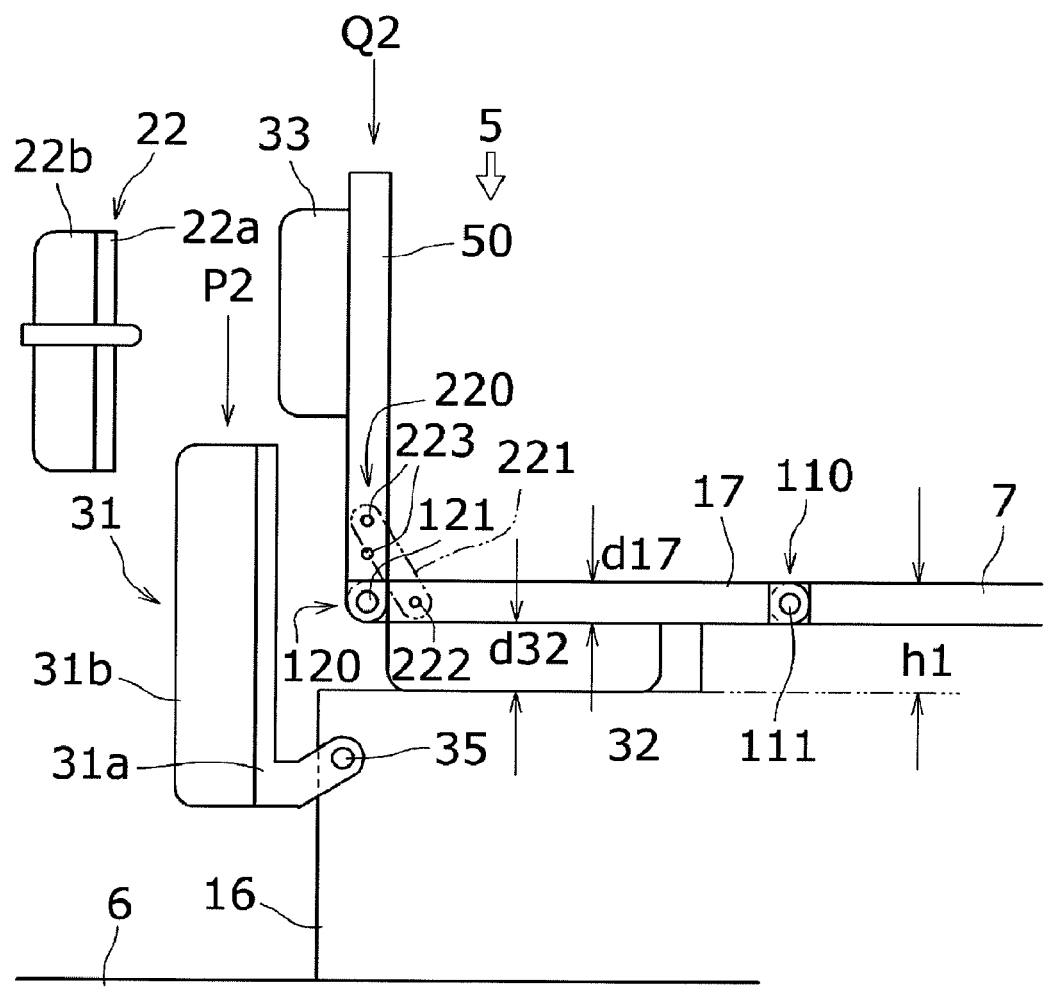
FIG. 4 is a side view showing posture of the screen assembly in an expanded state (the first embodiment)
Figure 5:
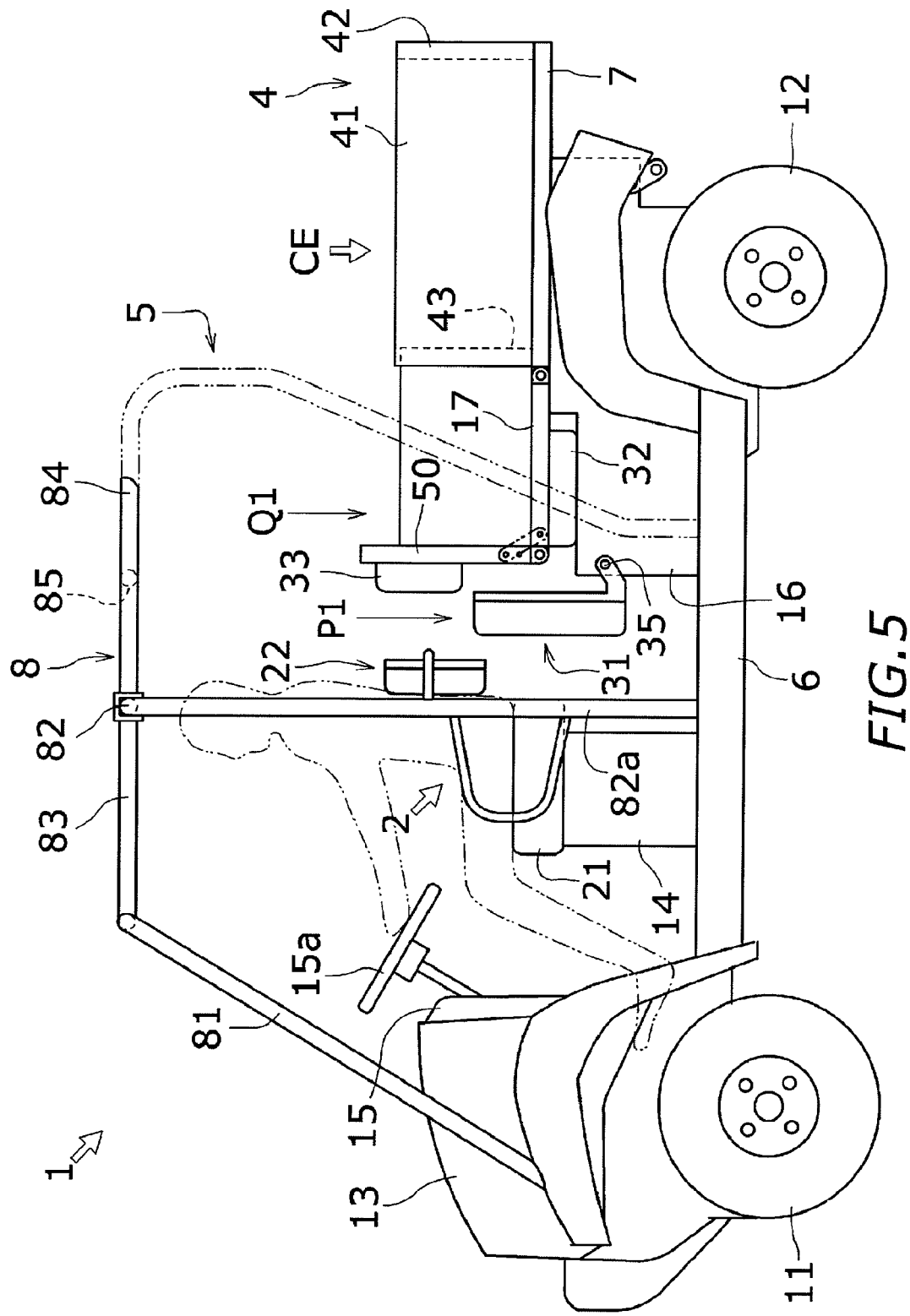
FIG. 5 is a side view showing the pick-up style utility vehicle in the expanded state (the first embodiment)

A pick-up style utility vehicle 1 is switchable between a non-expanded state where the vehicle is used as a four-seater vehicle (FIGS. 1 and 3) and an expanded state where the vehicle is used as a two-seater vehicle with an expanded cargo bed (FIGS. 4 and 5). Hereinafter, a configuration of this pick-up style utility vehicle will be described in detail based on the drawings.

Figure 1:
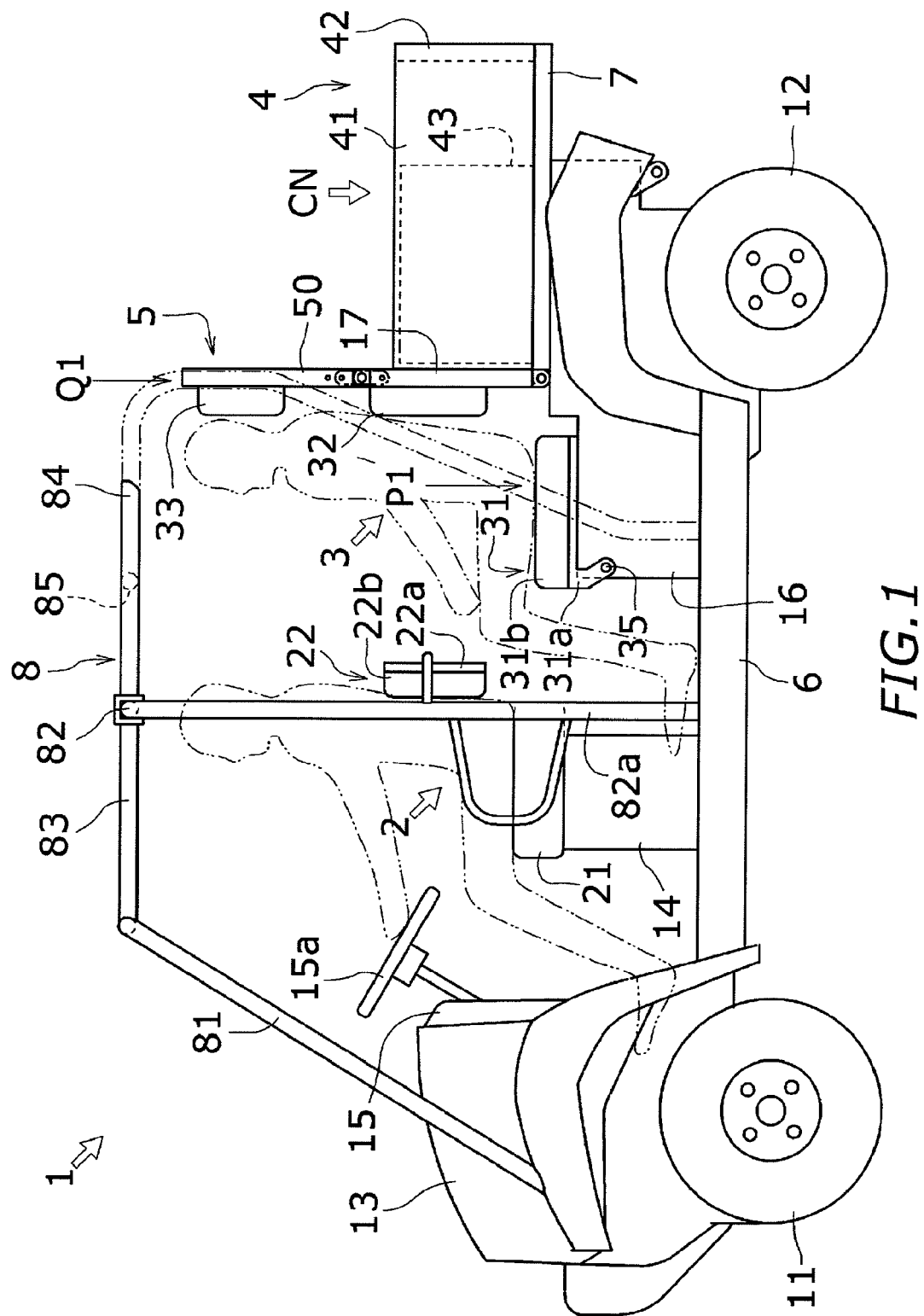
FIG. 1 is a side view showing a pick-up style utility vehicle in a non-expanded state (a first embodiment)

FIG. 1 is a side view showing the pick-up style utility vehicle 1 in the non-expanded state. The pick-up style utility vehicle 1 includes a chassis 6 provided with a pair of right and left front wheels 11 and a pair of right and left rear wheels 12. A hood 13, a front support stand 14, and a rear support stand 16 are arranged on the chassis 6 in this order from the front side to the rear side. A dashboard (an operation portion) 15 provided with a steering wheel 15a and the like is arranged in a rear part of the hood 13. A front seat 2 is arranged on the upper side of the front support stand 14. A rear seat 3, a screen assembly 5, a stationary bottom plate 7 and a plate portion 4 are arranged on the upper side of the rear support stand 16. A cabin frame 8 is arranged so as to surround the dashboard 15, the front seat 2, and the rear seat 3. The cabin frame 8 is fixed to the chassis 6. A cabin is formed in the interior surrounded by the chassis 6 and the cabin frame 8. Description of positional relationships (such as a front end and the upper side) in a first embodiment is based on posture in the non-expanded state (FIGS. 1 and 3).

The cabin frame 8 includes a first U shape member 81, a second U shape member 82, two connection members 83, 83, two L shape members 84, 84, and a connection member 85. The two connection members 83, 83, the second U shape member 82, and the two L shape members 84, 84 are arranged in this order after the first U shape member 81. The first U shape member 81 and the second U shape member 82 are formed in an upside down U shape opening downward in a front view. On the right and left sides, the two connection members 83, 83 connect the first U shape member 81 on the front side and the second U shape member 82 on the rear side. The two L shape members 84, 84 are formed in a symmetrically opposite L shape in a side view. The two L shape members 84, 84 are arranged so as to extend rearward from the second U shape member 82. The connection member 85 connects the two L shape members 84, 84 to each other.

The front seat 2 and the rear seat 3 are seats formed in a bench shape elongated in the right and left direction. In the present embodiment, two passengers can sit side by side in both the front seat 2 and the rear seat 3.

In FIG. 1, the front seat 2 is provided with a front main seat 21 and a front backrest 22. The front backrest 22 is provided with a backrest back plate 22a, and a front backrest cushion 22b fixed to the backrest back plate 22a. The front main seat 21 is fixed to the front support stand 14. The backrest back plate 22a is fixed to the second U shape member 82 so as to bridge both legs 82a, 82a of the second U shape member 82.

In FIG. 1, the rear seat 3 is provided with a rear main seat 31, a rear backrest 32, and a rear headrest 33. The rear main seat 31 is provided with a seat back plate 31a, and a seat cushion 31b fixed to the seat back plate 31a. A front end of the seat back plate 31*a* is supported pivotably on a horizontal shaft 35 in the right and left direction relative to the rear support stand 16.

In FIG. 1, a cargo bed CN in the non-expanded state is formed. The cargo bed CN in the non-expanded state includes the stationary bottom plate 7, and the plate portion 4 arranged on the stationary bottom plate 7. The stationary bottom plate 7 serves as a bottom face of the cargo bed CN. The plate portion 4 serves as a side face and a rear face of the cargo bed CN.

Figure 2:
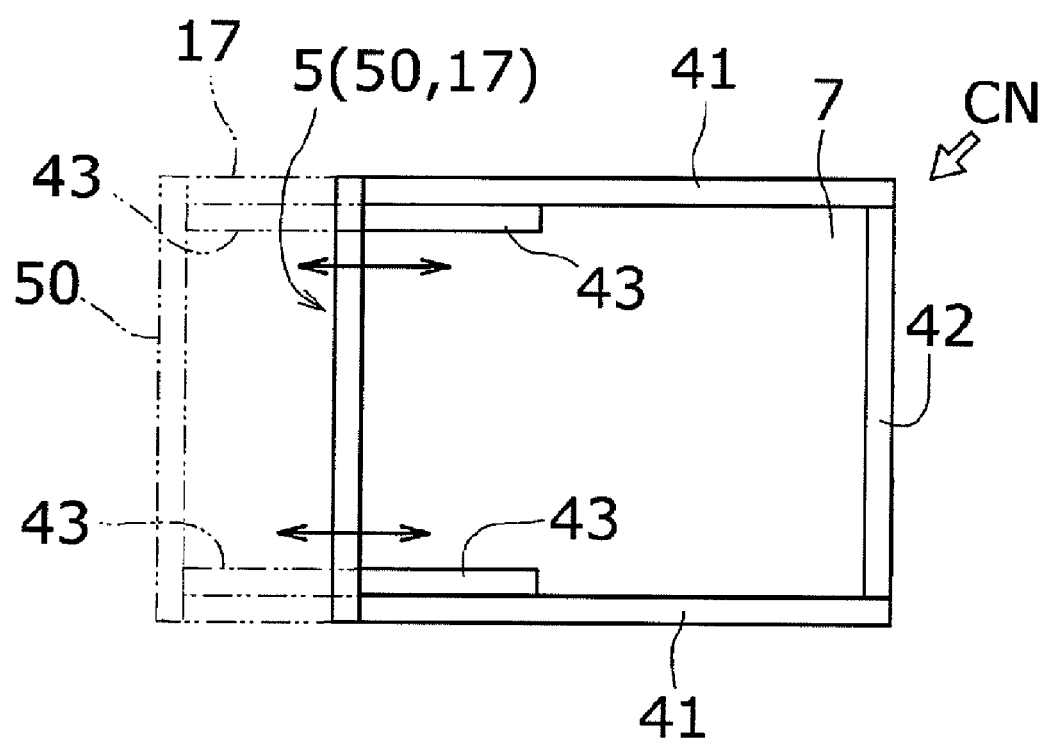
FIG. 2 is a plan view showing a cargo bed in the non-expanded state (the first embodiment)

FIG. 2 is a plan view showing the cargo bed CN in the non-expanded state. The plate portion 4 includes two stationary side plates 41, 41, a rear plate 42, and two expansion side plates 43, 43. The stationary side plates 41 are arranged on right and left ends of the stationary bottom plate 7. The rear plate 42 is arranged at a rear end of the stationary bottom plate 7. The expansion side plates 43 are provided on the inner side of the stationary side plates 41 in the right and left direction slidably in the back and forth direction.

FIG. 3 is a side view showing posture of the screen assembly 5 in the non-expanded state. The screen assembly 5 functions as a screen for closing the front side of the cargo bed in both the non-expanded state and an expanded state. In FIG. 3, the screen assembly 5 is provided with a screen 50, an expansion bottom plate 17, a first rotary support mechanism 110, a second rotary support mechanism 120, a fixing mechanism for a first shaft (not shown), and a fixing mechanism 220 for a second shaft.

The first rotary support mechanism 110 supports the expansion bottom plate 17 pivotably on a first horizontal shaft 111 in the right and left direction relative to the stationary bottom plate 7. In the present embodiment, the first rotary support mechanism 110 is a hinge. The first horizontal shaft 111 serving as a hinge shaft is arranged on axes of the stationary bottom plate 7 and the expansion bottom plate 17 in the width direction. That is, the first rotary support mechanism 110 is arranged between the stationary bottom plate 7 and the expansion bottom plate 17 so that the stationary bottom plate 7 and the expansion bottom plate 17 are not in direct contact with each other.

The second rotary support mechanism 120 supports the screen 50 pivotably on a second horizontal shaft 121 in the right and left direction relative to the expansion bottom plate 17. The second rotary support mechanism 120 is also a hinge. The second horizontal shaft 121 serving as a hinge shaft is also arranged on axes of the stationary bottom plate 7 and the screen 50 in the width direction.

The fixing mechanism 220 for the second shaft is a mechanism for fixing the expansion bottom plate 17 and the screen 50. The fixing mechanism 220 for the second shaft is formed by a plate hook 221, a first engagement pin 222, and second engagement pins 223, 223. The first engagement pin 222 is fixed to an upper end (a front end) of the expansion bottom plate 17. The second engagement pins 223 are fixed to a lower end (an edge) of the screen 50. Two engagement holes 221*a*, 221*b* engageable with the engagement pins 222, 223 and 223 are formed in the plate hook 221 along the longitudinal direction of the plate hook 221.

The fixing mechanism for the first shaft (not shown) is a mechanism for fixing the stationary bottom plate 7 and the expansion bottom plate 17. The same configuration as the fixing mechanism 220 for the second shaft can be adapted for the fixing mechanism for the first shaft.

The rear backrest 32 is fixed to a front face of the expansion bottom plate 17. The headrest 33 is fixed to a front lower end of the screen 50.

In FIG. 3, the expansion bottom plate 17 stands up relative to the stationary bottom plate 7. The screen 50 is positioned on the expansion bottom plate 17. A position of the screen assembly 5 (the expansion bottom plate 17 and the screen 50) at this time is a normal position Q1. The screen 50 and the expansion bottom plate 17 at the normal position Q1 function as the screen for closing the front side of the cargo bed CN.

In FIG. 3, the expansion bottom plate 17 and the screen 50 are held at the normal position Q1 by the fixing mechanism for the first shaft and the fixing mechanism 220 for the second shaft. The engagement holes 221*a* and 221*b* of the plate hook 221 are engaged with the first engagement pin 222 of the expansion bottom plate 17 and the second engagement pin 223 of the screen 50 in the fixing mechanism 220 for the second shaft. Similarly, the expansion bottom plate 17 is fixed to the stationary bottom plate 7 by the fixing mechanism for the first shaft (not shown).

In FIG. 3, the rear main seat 31 is disposed on the rear support stand 16. Since the screen assembly 5 is at the normal position Q1, the rear backrest 32 and the rear headrest 33 are positioned on the rear side and the upper side of the rear main seat 31. A position of the rear seat 3 (particularly the rear main seat 31) at this time is a use position P1. When the rear seat 3 is at the use position P1, the passenger can sit in the rear seat 3.

FIG. 4 is a side view showing the posture of the screen assembly 5 in the expanded state. In FIG. 4, the rear main seat 31 is shunted to the front side. A position of the rear main seat 31 at this time is a shunting position P2. Since the rear main seat 31 is shunted to the front side, the space previously occupied by the rear main seat 31 becomes empty space. The expansion bottom plate 17 is brought down forward so as to fill this empty space. At this time, the stationary bottom plate 7 and the expansion bottom plate 17 are aligned in the horizontal direction. The screen 50 stands up relative to the expansion bottom plate 17. A position of the screen assembly 5 (the expansion bottom plate 17 and the screen 50) at this time is an expansion position Q2. The expansion bottom plate 17 at the expansion position Q2 serves as the bottom face of the cargo bed CE in the expanded state together with the stationary bottom plate 7. The screen 50 at the expansion position Q2 functions as the screen for closing the front side of the cargo bed CE.

The screen assembly 5 at the expansion position Q2 is held by the fixing mechanism for the first shaft (not shown) and the fixing mechanism 220 for the second shaft. The engagement holes 221*a* and 221*b* of the plate hook 221 are engaged with the first engagement pin 222 of the expansion bottom plate 17 and the second engagement pin 223 of the screen 50 in the fixing mechanism 220 for the second shaft. Similarly, the expansion bottom plate 17 is fixed to the stationary bottom plate 7 by the fixing mechanism for the first shaft (not shown).

The rear support stand 16 is formed so as to store the expansion bottom plate 17 and the rear backrest 32 in the expanded state. That is, a difference h1 between an upper face position of the rear support stand 16 and an upper face position of the stationary bottom plate 7, thickness d17 of the expansion bottom plate 17, and thickness d32 of the rear backrest 32 are set so that the difference h1 is substantially equal to the sum of the thickness d17 and the thickness d32.

FIG. 5 is a side view showing the pick-up style utility vehicle 1 in the expanded state. In FIG. 5, the cargo bed CE in the expanded state is formed. The cargo bed CE in the expanded state includes the stationary bottom plate 7, the expansion bottom plate 17, the two stationary side plates 41, 41, the two expansion side plates 43, 43 and the rear plate 42. In the expanded state, the expansion side plates 43 stored on the inner side of the stationary side plates 41 project to the front side of the stationary side plates 41 so as to be in contact with the screen 50.

The screen 50 for partitioning the cargo bed CN and ride space is provided in the first embodiment. The ride space is space provided on the front side of the cargo bed CN in which people can ride. The front seat 2 and the rear seat 3 are arranged in the ride space. The cargo bed is changeable between the expanded state where the cargo bed is expanded forward into the ride space and the non-expanded state where the cargo bed does not occupy the ride space. The expansion bottom plate 17 is pivotable relative to the stationary bottom plate 7 and the screen 50. Therefore, the passenger pivots the expansion bottom plate 17 and the screen 50 upon switching of the non-expanded state and the expanded state, so that the screen 50 can be moved. Since there is no need for the passengers to lift the screen 50 up, the screen 50 is easily movable by even one passenger.

Second Embodiment

Figure 6:
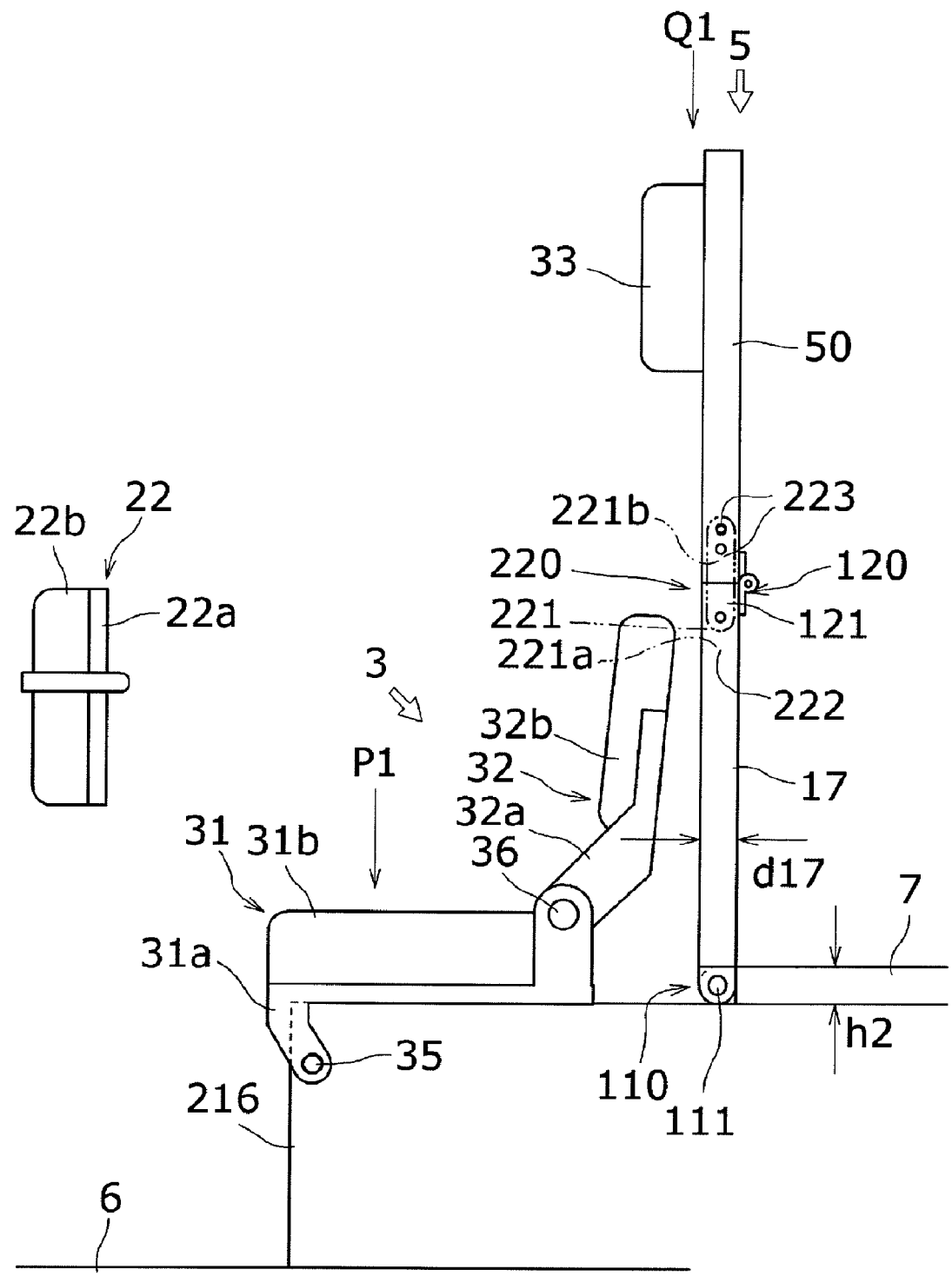
FIG. 6 is a side view showing a rear seat and the screen assembly in the non-expanded state (a second embodiment)
Figure 7:
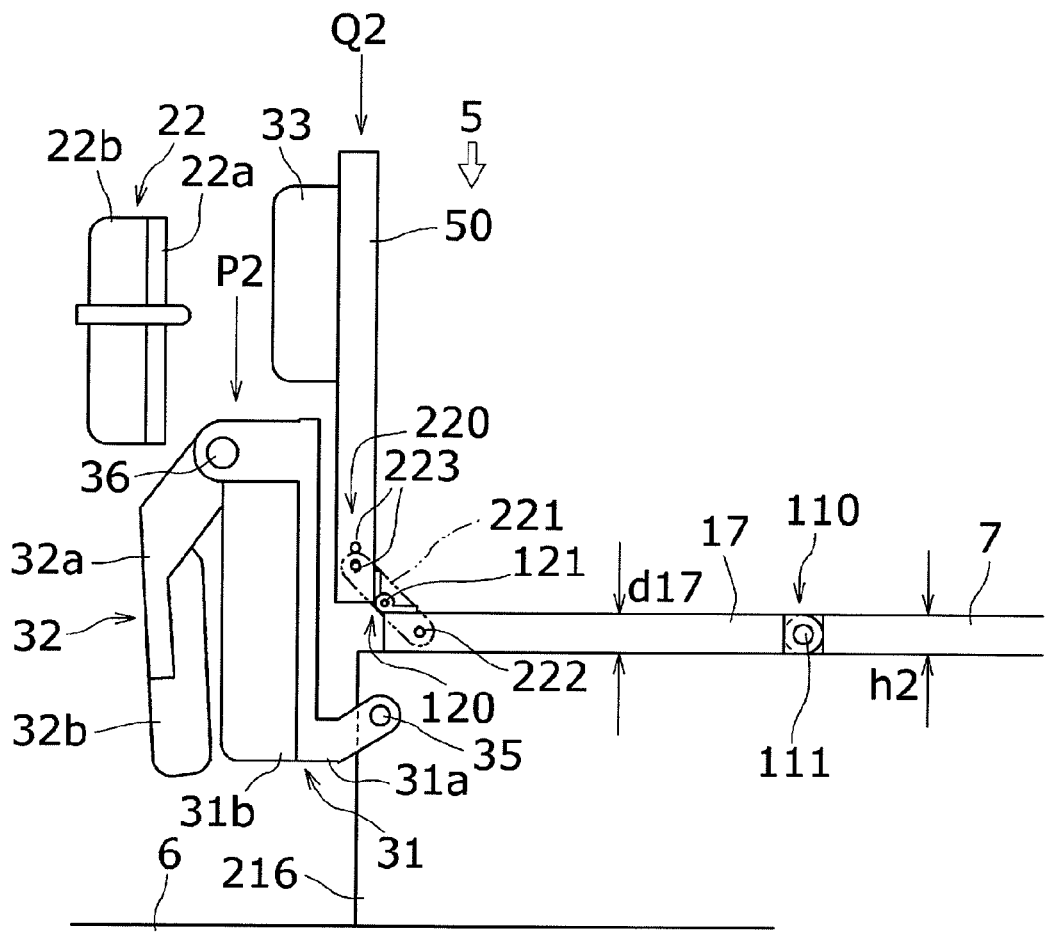
FIG. 7 is a side view showing the rear seat and the screen assembly in the expanded state (the second embodiment)
Figure 8:
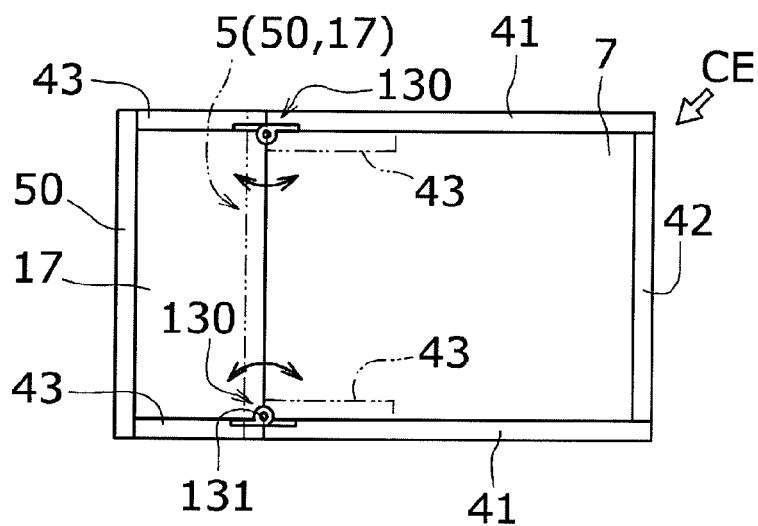
FIG. 8 is a plan view showing the cargo bed in the expanded state (the second embodiment)

FIGS. 6 to 8 show the pick-up style utility vehicle 1 in a second embodiment. The second embodiment is the same as the first embodiment except for configurations of the rear seat 3 and a rear support stand 216, and a movement mechanism of the expansion side plates 43. In the second embodiment, parts which are common to the first embodiment will be denoted by the same reference numerals. Description of positional relationships in the second embodiment is based on posture in the non-expanded state (FIG. 6).

FIG. 6 is a side view showing the rear seat 3 and the screen assembly 5 in the non-expanded state. In FIG. 6, the rear seat 3 is at the use position P1, and the screen assembly 5 is at the normal position Q1.

In the rear seat 3 in the second embodiment, the rear backrest 32 is provided pivotably on a horizontal shaft 36 in the right and left direction relative to the rear main seat 31. The rear backrest 32 is provided with a backrest back plate 32a, and a backrest cushion 32b fixed to the backrest back plate 32a. A lower end of the backrest back plate 32a is supported pivotably on the horizontal shaft 36 relative to the seat back plate 31a.

The screen assembly 5 in the second embodiment is formed as well as the first embodiment. The first rotary support mechanism 110 and the second rotary support mechanism 120 in the second embodiment are also formed by hinges. However, the second horizontal shaft 121, serving as the hinge shaft, is positioned out of the axes of the expansion bottom plate 17 and the screen 50 in the width direction in the second rotary support mechanism 120 in the second embodiment. That is, the second rotary support mechanism 120 is arranged on the side (the rear side) of the stationary bottom plate 7 and the expansion bottom plate 17 so that the expansion bottom plate 17 and the screen 50 can be in direct contact with each other.

FIG. 7 is a side view showing the rear main seat 31 and the screen assembly 5 in the expanded state. In FIG. 7, the rear main seat 31 is at the shunting position P2, and the screen assembly 5 is at the expansion position Q2. In the second embodiment, the rear backrest 32 is integrated with the rear main seat 31. Therefore, the rear backrest 32 is shunted to the front side together with the rear main seat 31 in the expanded state.

In the second embodiment, the rear support stand 216 is formed so as to support the expansion bottom plate 17 at the expansion position Q2. That is, a difference h2 between an upper face position in a front part of the rear support stand 216 and the upper face position of the stationary bottom plate 7, and the thickness d17 of the expansion bottom plate 17 are set so that the difference h2 is substantially equal to the thickness d17.

FIG. 8 is a plan view showing the cargo bed CE in the expanded state. In the second embodiment, a rotary movement mechanism is used for the expansion side plates 43 instead of a slide mechanism. In FIG. 8, edges of the expansion side plates 43 and front ends of the stationary side plates 41 are connected by third rotary support mechanisms 130. The third rotary support mechanisms 130 are hinges. The expansion side plates 43 are supported pivotably on vertical shafts 131 serving as hinge shafts relative to the stationary side plates 41. The expansion side plates 43 project to the front side of the stationary side plates 41 in the expanded state, and are stored on the inner side of the stationary side plates 41 in the right and left direction in the non-expanded state.

Third Embodiment

Figure 9:
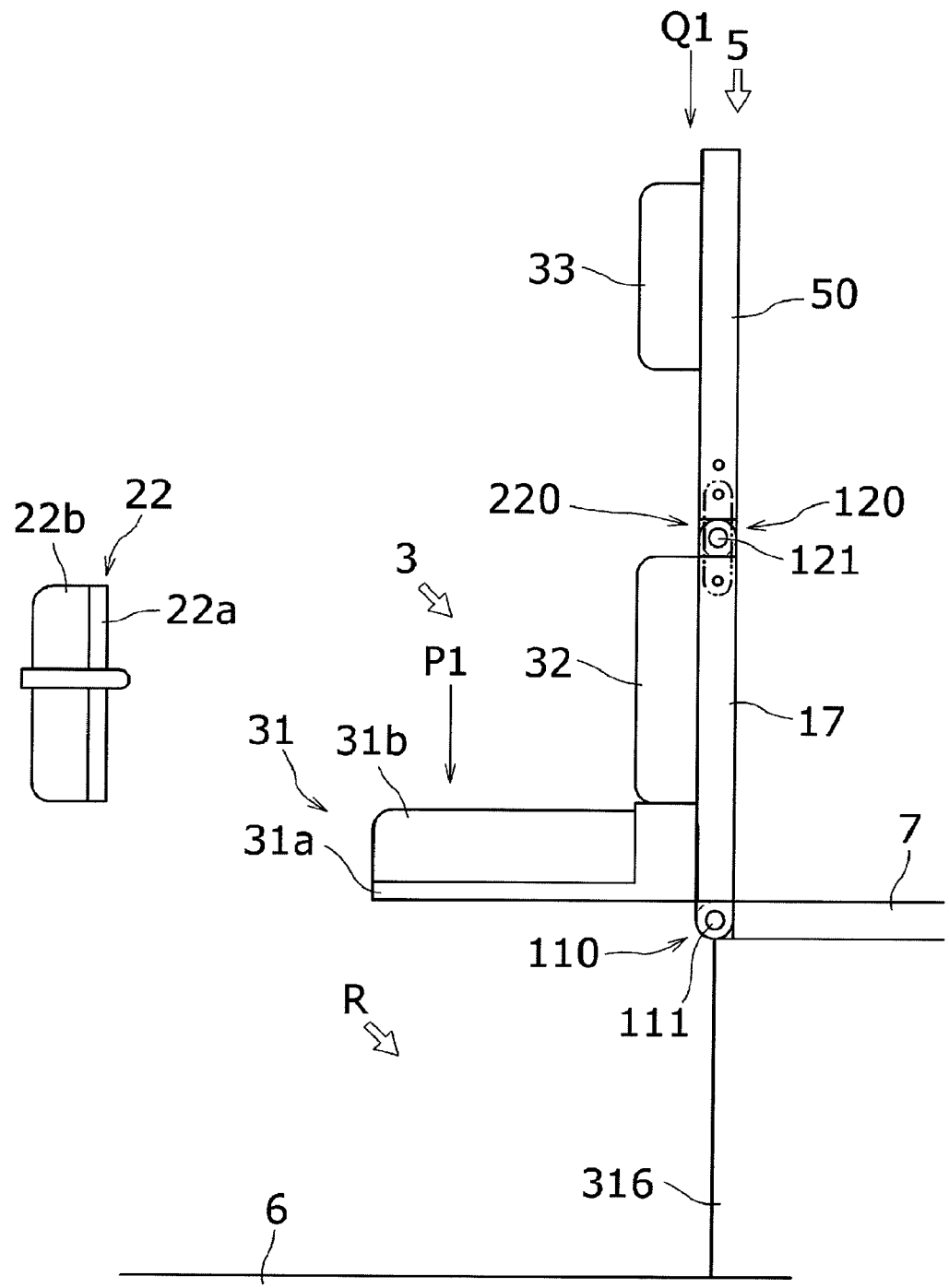
FIG. 9 is a side view showing the rear seat and the screen assembly in the non-expanded state (a third embodiment)
Figure 10:
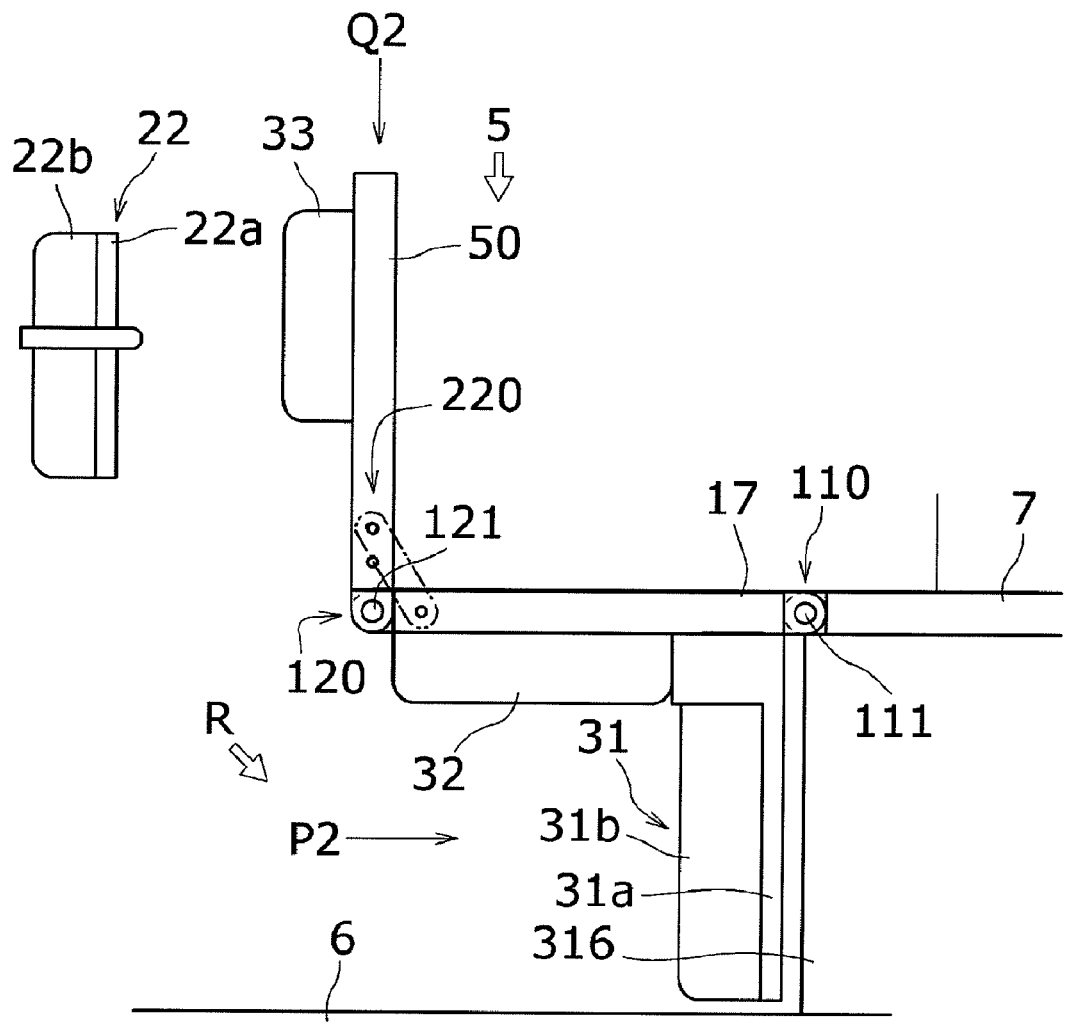
FIG. 10 is a side view showing the rear seat and the screen assembly in the expanded state (the third embodiment)

FIGS. 9 and 10 show the pick-up style utility vehicle 1 in a third embodiment. The third embodiment is the same as the first embodiment except a support structure of the rear main seat 31 and a configuration of a rear support stand 316. In the third embodiment, parts which are common to the first embodiment will be denoted by the same reference numerals. Description of positional relationships in the third embodiment is based on the posture in the non-expanded state (FIG. 9).

FIG. 9 is a side view showing the rear main seat 31 and the screen assembly 5 in the non-expanded state. In FIG. 9, the rear seat 3 is at the use position P1, and the screen assembly 5 is at the normal position Q1.

In the third embodiment, the rear main seat 31 is also fixed to the expansion bottom plate 17.

In the third embodiment, the rear support stand 316 is formed so as not to project to the front side of the screen assembly 5 in the non-expanded state. That is, empty space is provided on the lower side of the rear main seat 31 at the use position P1. This empty space is shunting space R of the rear main seat 31. The rear main seat 31 at the shunting position P2 can be stored in the shunting space R. The shunting space R is formed in the chassis 6.

FIG. 10 is a side view showing the rear main seat 31 and the screen assembly 5 in the expanded state. In FIG. 10, the rear main seat 31 is at the shunting position P2, and the screen assembly 5 is at the shunting position Q2. The rear main seat 31 at the shunting position P2 is stored in the shunting space R.

Fourth Embodiment

Figure 11:
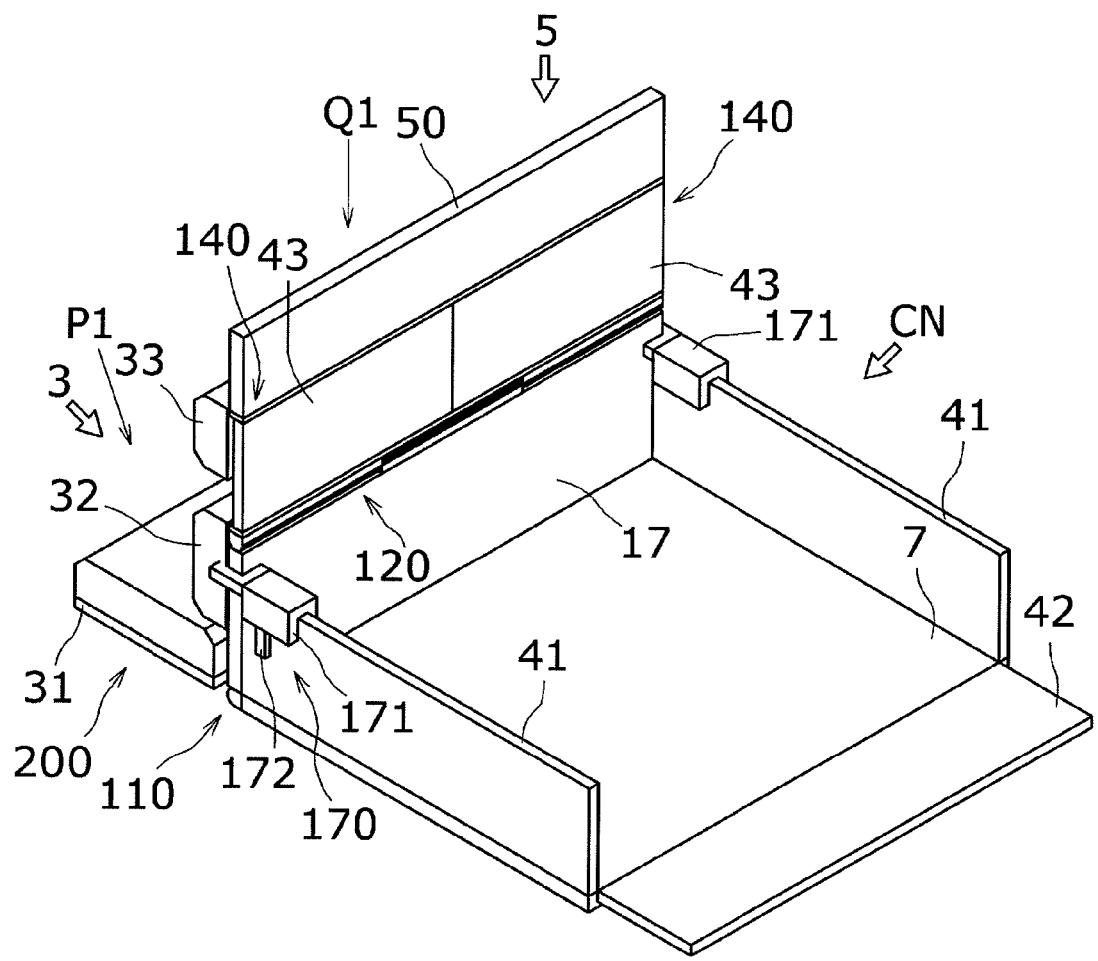
FIG. 11 is a perspective view of the cargo bed in a first stage (the non-expanded state) seen from the rear side (a fourth embodiment)
Figure 12:
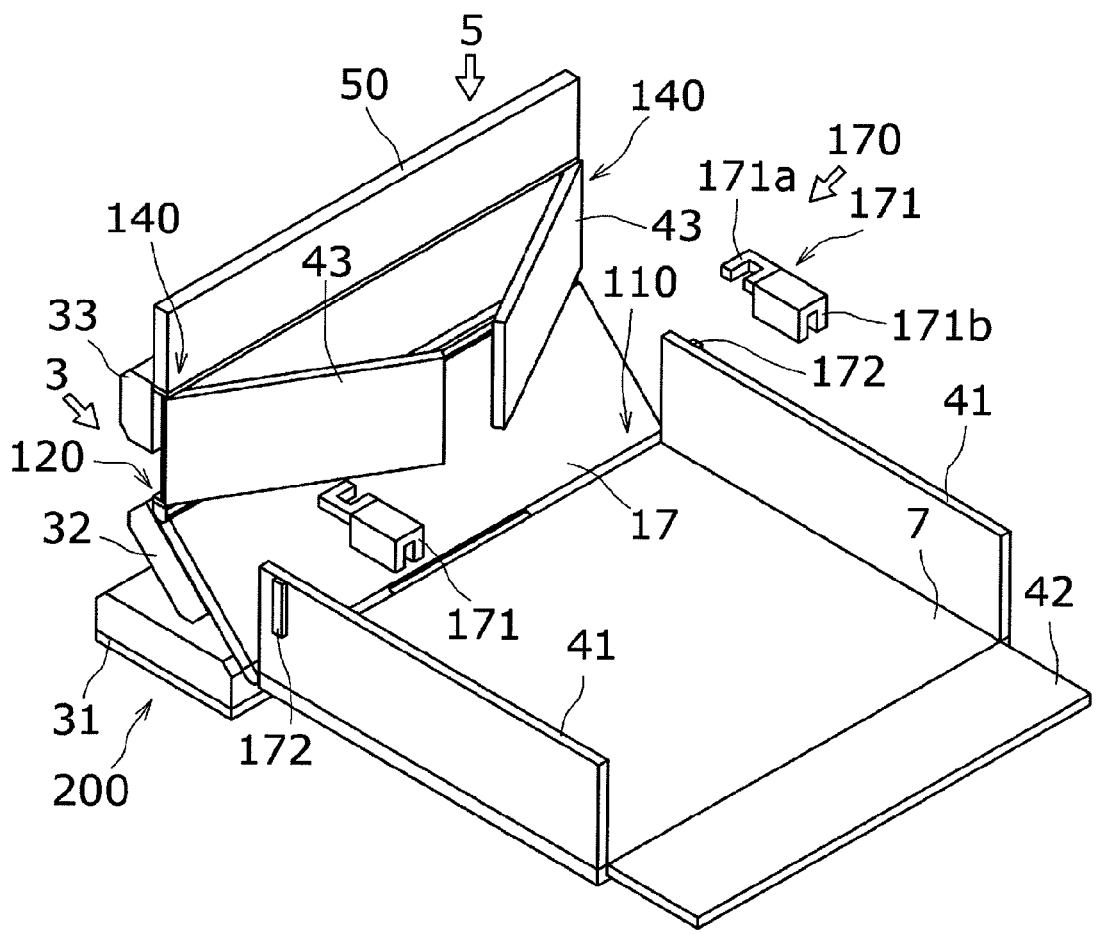
FIG. 12 is a perspective view of the cargo bed in a second stage seen from the rear side (the fourth embodiment)
Figure 13:
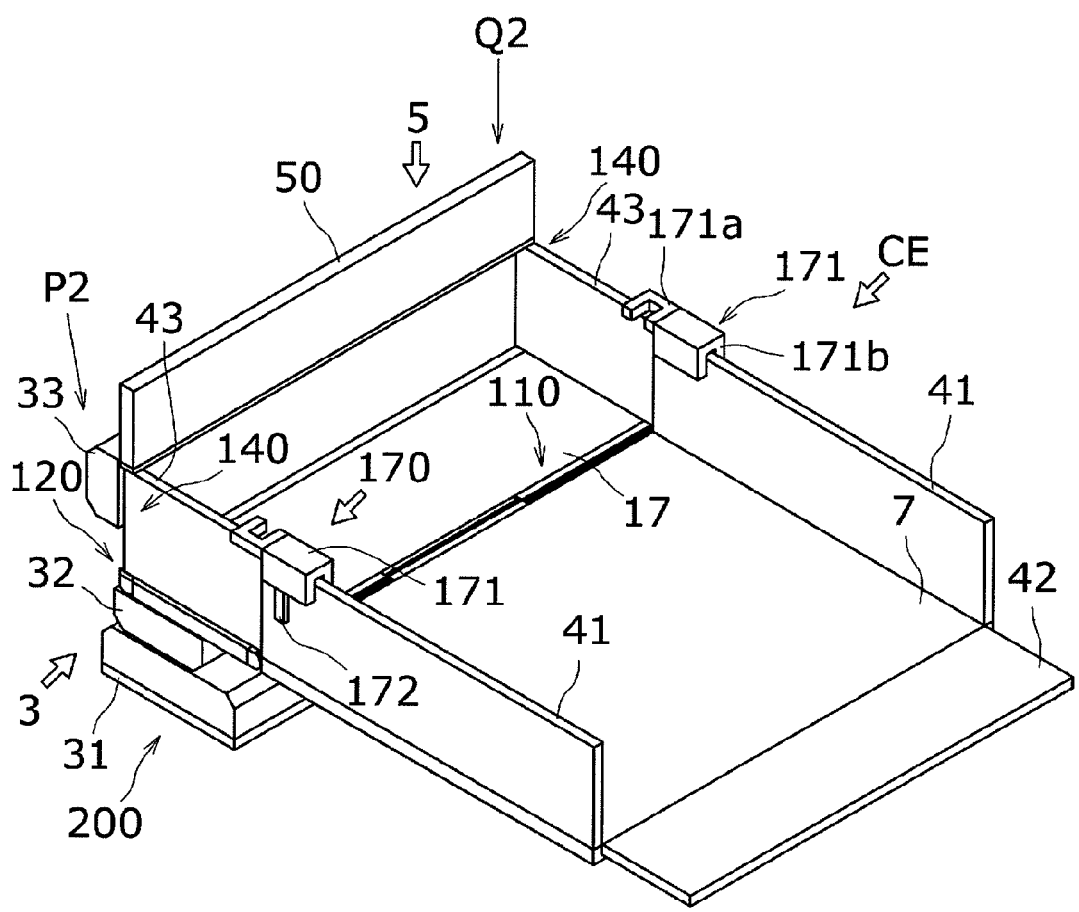
FIG. 13 is a perspective view of the cargo bed in a third stage (the expanded state) seen from the rear side (the fourth embodiment)

FIGS. 11 to 13 show the pick-up style utility vehicle 1 in a fourth embodiment. The fourth embodiment is the same as the first embodiment except for a movement mechanism 200 of the rear main seat 31, support mechanisms of the expansion side plates 43, and a screen fixing mechanism (latches 171). In the fourth embodiment, parts which are common to the first embodiment will be denoted by the same reference numerals. Description of positional relationships in the fourth embodiment is based on the posture in the non-expanded state (FIG. 11).

FIG. 11 is a perspective view of the cargo bed in a first stage (the non-expanded state) as seen from the rear side. In FIG. 11, the rear seat 3 is at the use position P1, and the screen assembly 5 is at the normal position Q1.

In the fourth embodiment, the pick-up style utility vehicle 1 is provided with the movement mechanism 200 of the rear main seat 31. The movement mechanism 200 incorporates the rear main seat 31 into the screen assembly 5. More specifically, when the expansion bottom plate 17 is pivoted forward or rearward, the rear main seat 31 is moved downward or upward. The movement mechanism 200 is formed by a linkage mechanism (not shown) connecting the expansion bottom plate 17 and the rear main seat 31.

In the fourth embodiment, the two expansion side plates 43, 43 are respectively supported on the screen 50 via two fourth rotary support mechanisms 140, 140. The fourth rotary support mechanisms 140 support the expansion side plates 43 pivotably on corresponding vertical shafts relative to the screen 50.

In the fourth embodiment, the pick-up style utility vehicle 1 is provided with the screen fixing mechanisms 170. The screen fixing mechanisms 170 are respectively provided with the latches 171 and engagement rails 172.

As shown in FIG. 12, the latch 171 is provided with a vertical part 171a and a lateral part 171b. The vertical part 171a has a U shape section in plan view. Therefore, the vertical part 171a can nip the screen 50 at the normal position Q1. The lateral part 171b has a U shape section as seen in a rear view. Therefore, the lateral part 171b can nip the stationary side plate 41 and the expansion side plate 43 at the expansion position Q2. The engagement rails 172 are formed on outer faces of the stationary side plates 41 along the vertical direction. The lateral part 171b can be engaged with the engagement rail 172. The latches 171 cannot be moved in the back and forth direction relative to the stationary side plates 41 due to the engagement.

In the first stage of FIG. 11, the latches 171 are fixed to the stationary side plates 41. At this time, the latches 171 fix the stationary side plates 41 and the screen 50. As a result, the screen assembly 5 is held at the normal position Q1. The two expansion side plates 43, 43 are closed relative to the screen 50.

FIG. 12 is a perspective view of the cargo bed in a second stage as seen from the rear side. In FIG. 12, the latches 171 are removed from the stationary side plates 41. As a result, holding of the screen assembly 5 is released. In the second stage, the passenger moves the screen assembly 5 from the normal position Q1 to the expansion position Q2. In accordance with bringing down of the expansion bottom plate 17 forward, the movement mechanism 200 moves the rear main seat 31 downward. Therefore, the expansion bottom plate 17 and the rear backrest 32 can be stored in the empty space generated by shunting the rear main seat 31 to the lower side. The passenger opens the two expansion side plates 43, 43 relative to the screen 50.

FIG. 13 is a perspective view of the cargo bed in a third stage (the expanded state) seen from the rear side. In FIG. 13, the screen assembly 5 is at the expansion position Q2, and the rear main seat 31 is at the shunting position P2. The expansion side plates 43 are respectively aligned side by side with the stationary side plates 41 in the back and forth direction. In such a way, the expanded cargo bed CE is formed. In addition, the latches 171 are respectively attached to the stationary side plates 41. At this time, the latches 171 respectively fix the stationary side plates 41 and the expansion side plates 43. As a result, the screen assembly 5 is held at the expansion position Q2.

Fifth Embodiment

Figure 14:
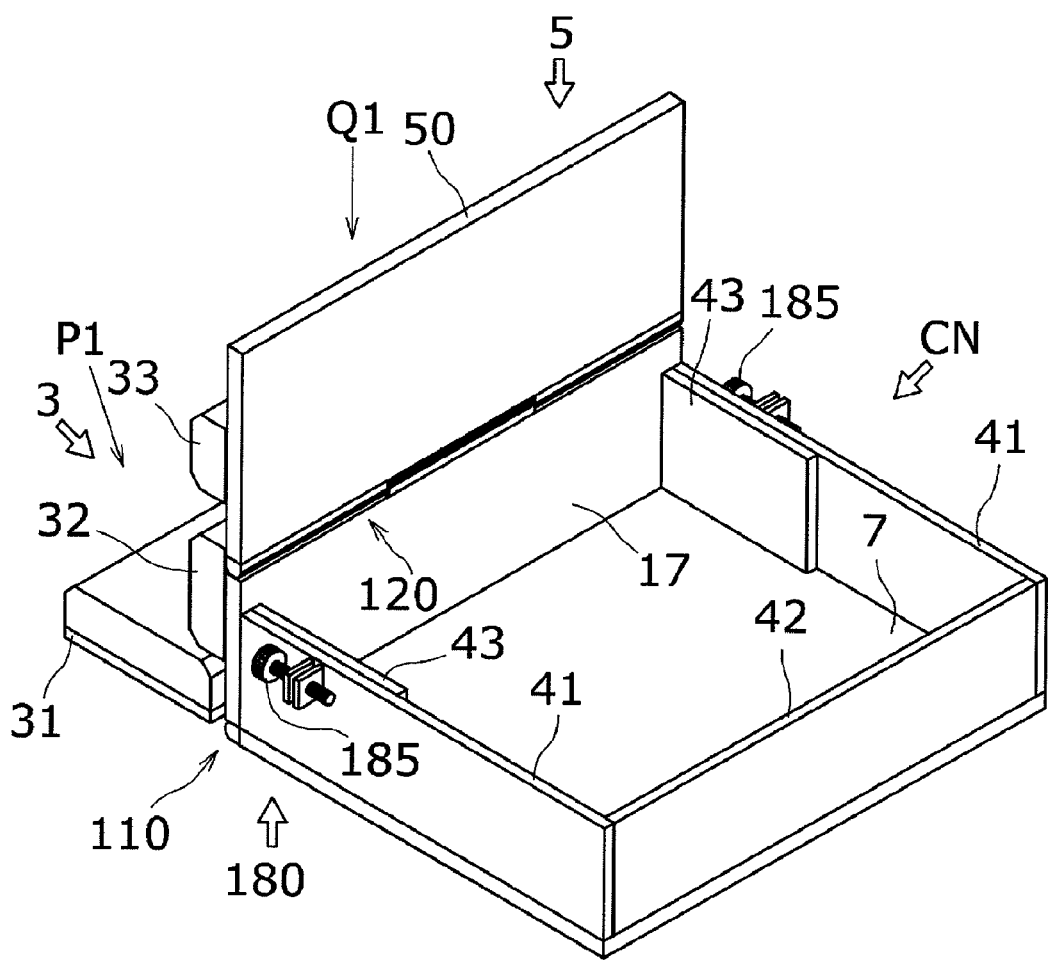
FIG. 14 is a side view showing the cargo bed in the non-expanded state (a fifth embodiment)
Figure 15:
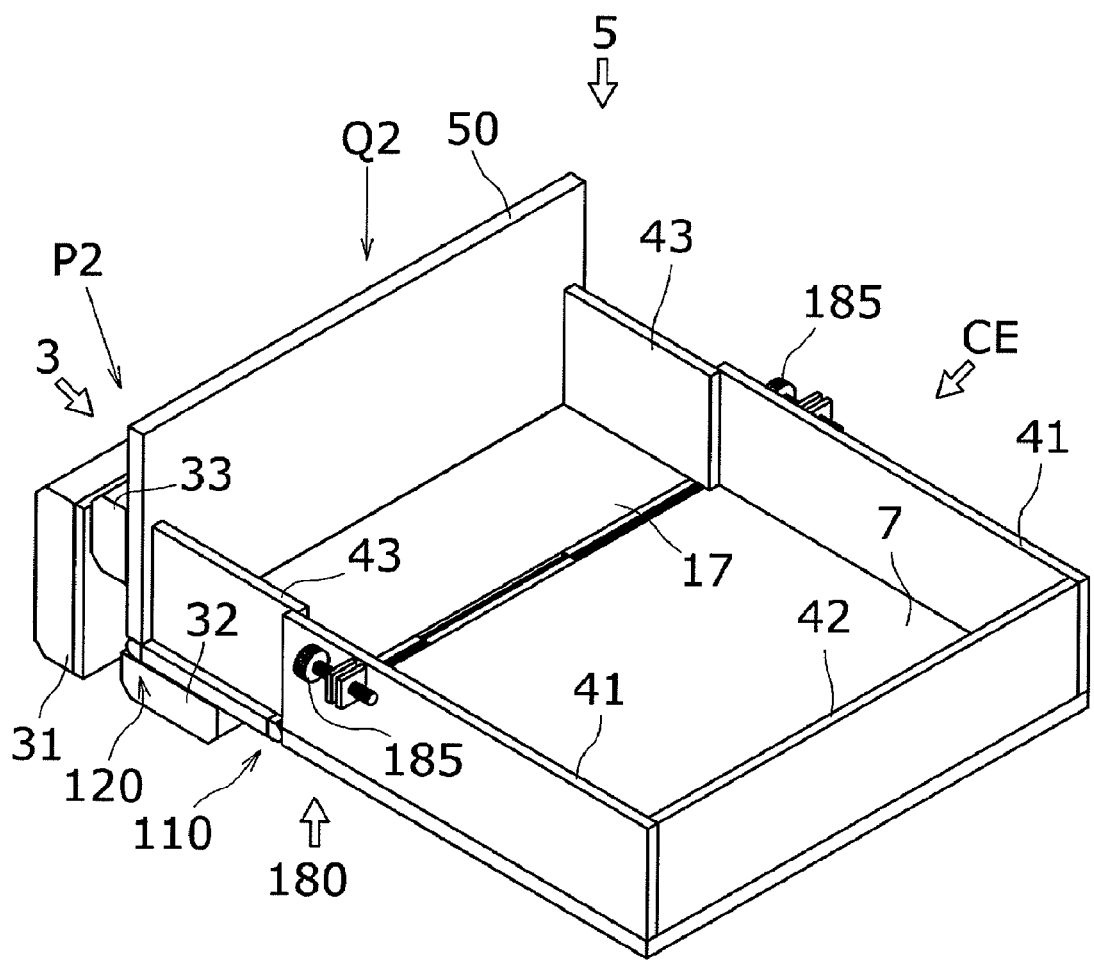
FIG. 15 is a side view showing the cargo bed in the expanded state (the fifth embodiment)

FIGS. 14 and 15 show the pick-up style utility vehicle 1 in a fifth embodiment. A guide mechanism 180 for guiding movement of the screen assembly 5 is provided in the fifth embodiment. The fifth embodiment is the same as the first embodiment except for the guide mechanism 180. In the fifth embodiment, parts which are common to the first embodiment will be denoted by the same reference numerals. Description of positional relationships in the fifth embodiment is based on the posture in the non-expanded state (FIG. 14).

FIG. 14 is a side view showing the cargo bed CN in the non-expanded state. In FIG. 14, the rear seat 3 is at the use position P1, and the screen assembly 5 is at the normal position Q1.

In the fifth embodiment, the pick-up style utility vehicle 1 is provided with the guide mechanism 180. The guide mechanism 180 guides the screen assembly 5 so that the screen assembly 5 is moved between the normal position Q1 (FIG. 14) and the expansion position Q2 (FIG. 15) along a predetermined route. It should be noted that a specific configuration of the guide mechanism 180 is not shown.

The pick-up style utility vehicle 1 is provided with an operation lever 185 capable of locking and unlocking the screen assembly 5 at the normal position Q1. When the operation lever 185 is at a locking position, the screen assembly 5 at the normal position Q1 is fixed to the stationary bottom plate 7. As a result, the screen assembly 5 is held at the normal position Q1. Meanwhile, when the operation lever 185 is at an unlocking position, the holding of the screen assembly 5 is released.

FIG. 15 is a side view showing the cargo bed CE in the expanded state. In FIG. 14, when the passenger moves the operation lever 185 from the locking position to the unlocking position, the holding of the screen assembly 5 is released. At this time, the screen assembly 5 is movable between the normal position Q1 and the expansion position Q2 by the guide mechanism 180. As a result, the screen assembly 5 moves to the normal position Q1 by its own weight. That is, when the operation lever 185 is moved to the unlocking position, the screen assembly 5 automatically moves to the expansion position Q2. When the operation lever 185 is moved to the locking position after that, the screen assembly 5 is held at the expansion position Q2.

Sixth Embodiment

Figure 16:
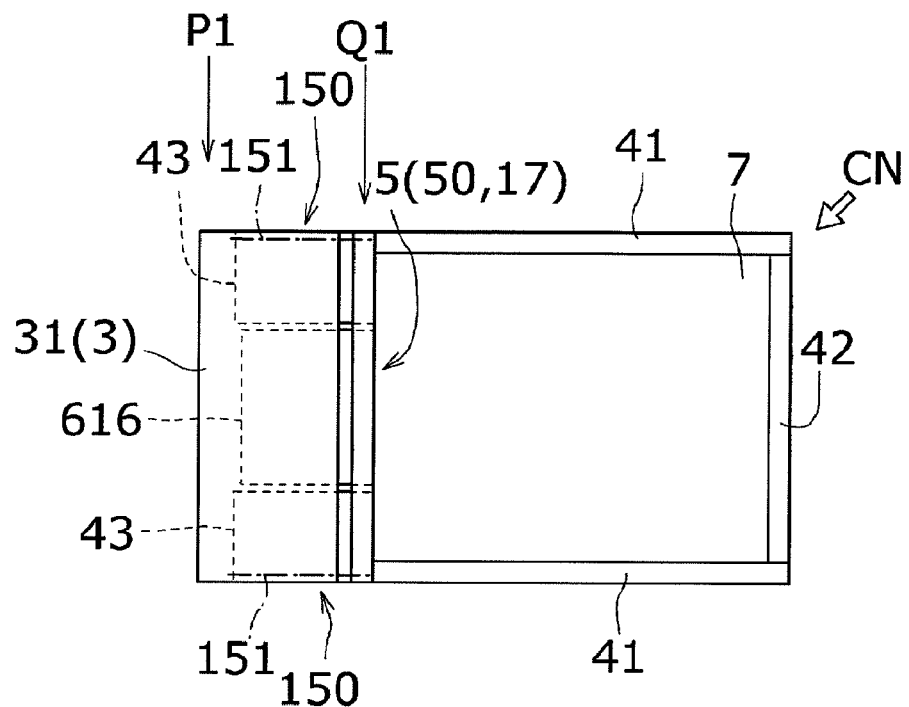
FIG. 16 is a plan view showing the cargo bed in the non-expanded state (a sixth embodiment)
Figure 17:
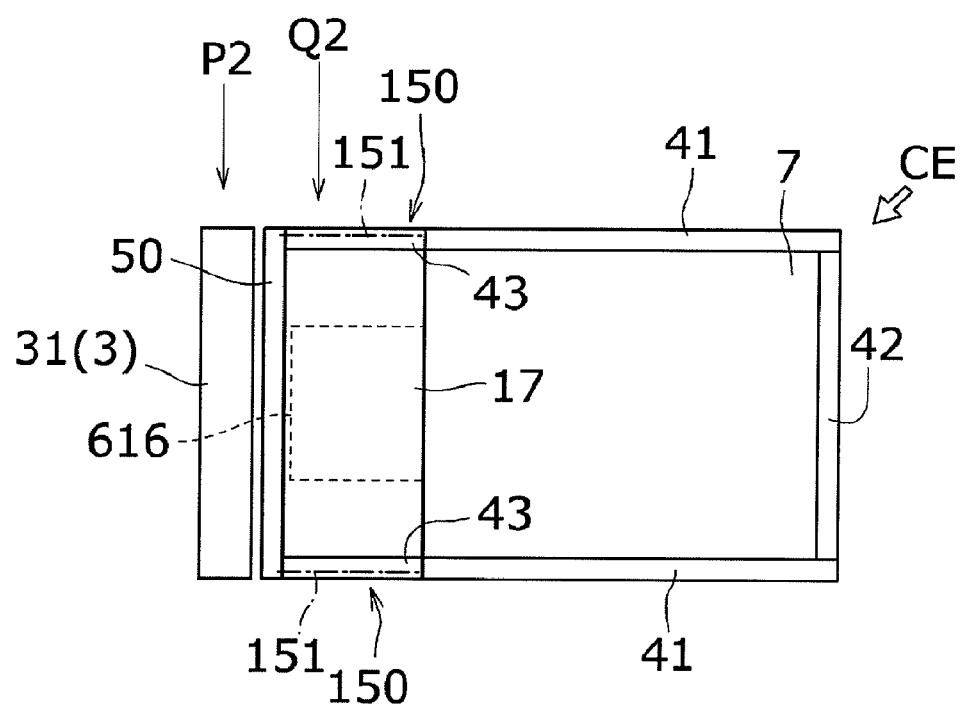
FIG. 17 is a plan view showing the cargo bed in the expanded state (the sixth embodiment)

FIGS. 16 and 17 show the pick-up style utility vehicle 1 in a sixth embodiment. The sixth embodiment is the same as the first embodiment except for a support structure of the expansion side plates 43 and a structure of a rear support stand 616. In the sixth embodiment, parts which are common to the first embodiment will be denoted by the same reference numerals. Description of positional relationships in the sixth embodiment is based on the posture in the non-expanded state (FIG. 16).

FIG. 16 is a plan view showing the cargo bed CN in the non-expanded state. In FIG. 16, the rear seat 3 is at the use position P1, and the screen assembly 5 is at the normal position Q1.

In the sixth embodiment, the pick-up style utility vehicle 1 is provided with fifth rotary support mechanisms 150 for supporting the expansion side plates 43. The fifth rotary support mechanisms 150 support the expansion side plates 43 pivotably on horizontal shafts 151 in the back and forth direction relative to the stationary bottom plate 7. The fifth rotary support mechanisms 150 are respectively provided on both the right and left sides of the pick-up style utility vehicle 1. The expansion side plates 43 and the fifth rotary support mechanisms 150 are arranged on the lower side of the rear main seat 31 at the use position P1. In the non-expanded state, the two expansion side plates 43, 43 are brought down to the inner side in the right and left direction, and the two expansion side plates 43, 43 and the stationary bottom plate 7 are parallel to each other.

The rear support stand 616 is formed so as not to be abutted with arrangement space for the expansion side plates 43 and the fifth rotary support mechanisms 150. Specifically, the rear support stand 616 is provided only in a center part on the lower side of the rear main seat 31 at the use position P1.

FIG. 17 is a plan view showing the cargo bed CE in the expanded state. In FIG. 17, the rear seat 3 is at the shunting position P2, and the screen assembly 5 is at the expansion position Q2. Upon a change from the normal position Q1 to the expansion position Q2, the passenger pivots the expansion side plates 43 upward, so that the expansion side plates 43 stand up. After the expansion side plates 43 stand up, the passenger pivots the expansion bottom plate 17 forward, so that the expansion bottom plate 17 is moved between the right and left expansion side plates 43, 43. In such a way, the cargo bed CE in the expanded state is formed.

Seventh Embodiment

Figure 18:
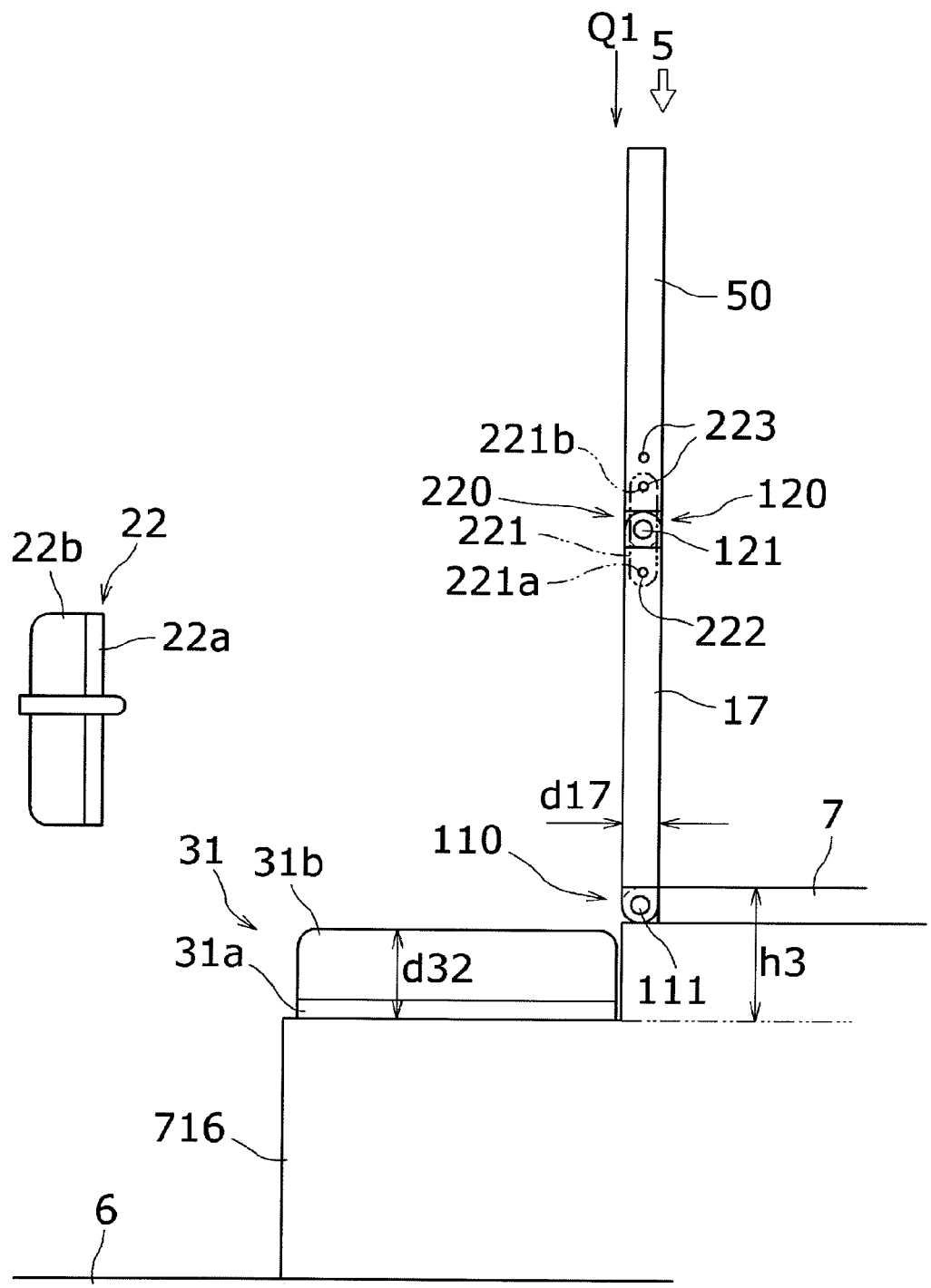
FIG. 18 is a side view showing the posture of the screen assembly in the non-expanded state (a seventh embodiment)
Figure 19:
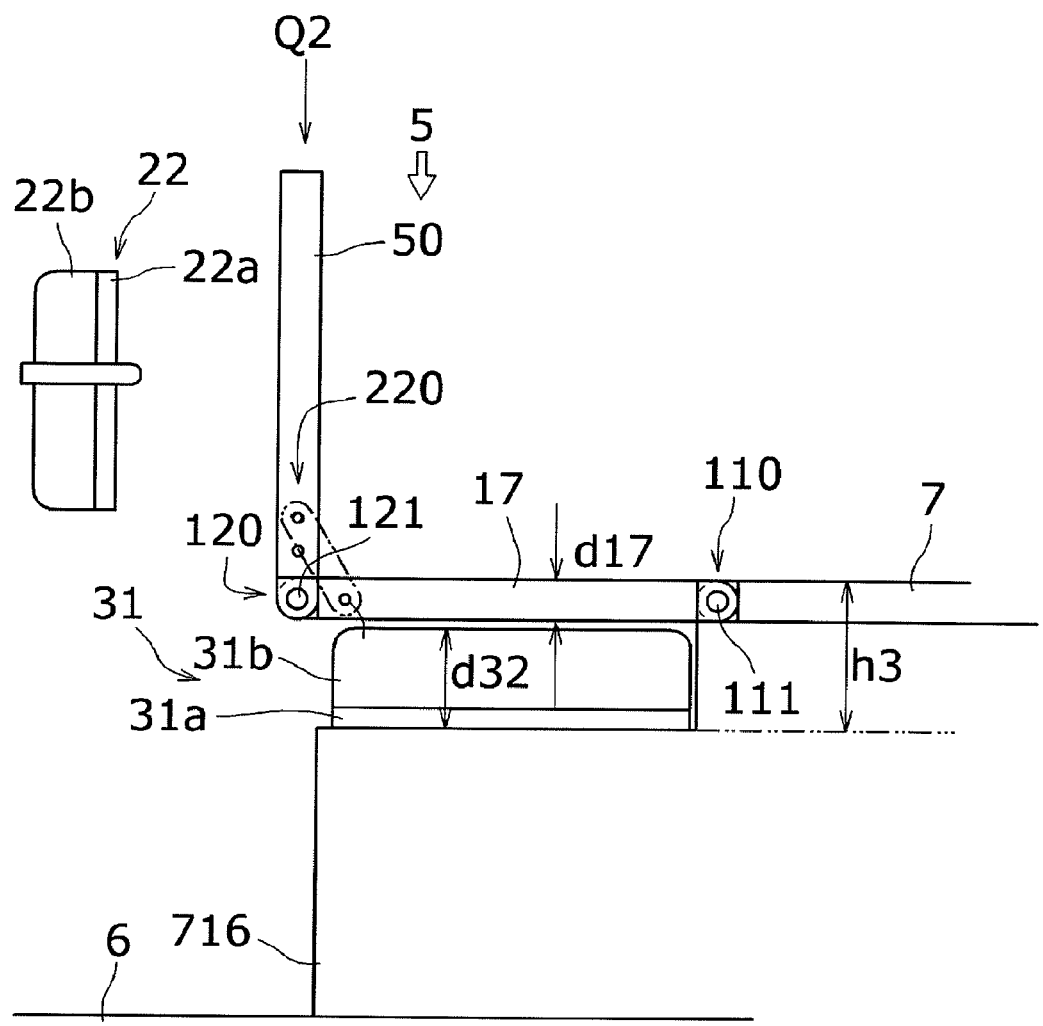
FIG. 19 is a side view showing the posture of the screen assembly in the expanded state (the seventh embodiment)

FIGS. 18 and 19 show the pick-up style utility vehicle 1 in a seventh embodiment. The rear backrest 32 and the rear headrest 33 are not provided but the rear main seat 31 is provided in the seventh embodiment. The seventh embodiment is the same as the first embodiment except for a support structure of the rear main seat 31 and a structure of a rear support stand 716. In the seventh embodiment, parts which are common to the first embodiment will be denoted by the same reference numerals. Description of positional relationships in the seventh embodiment is based on the posture in the non-expanded state (FIG. 18).

FIG. 18 is a side view showing the posture of the screen assembly 5 in the non-expanded state. In FIG. 18, the screen assembly 5 is at the normal position Q1. In the seventh embodiment, the rear main seat 31 is fixed to an upper face in a front part of the rear support stand 716. That is, the rear main seat 31 is not movable.

FIG. 19 is a side view showing the posture of the screen assembly 5 in the expanded state. In FIG. 19, the screen assembly 5 is at the expansion position Q2. In the seventh embodiment, the rear support stand 716 is formed so as not to be abutted with the expansion bottom plate 17 in the expanded state. That is, a difference h3 between an upper face position of the rear support stand 716 and the upper face position of the stationary bottom plate 7, the thickness d17 of the expansion bottom plate 17, and thickness d31 of the rear main seat 31 are set so that the difference h3 is substantially equal to the sum of the thickness d17 and the thickness d31.

Other Embodiment

The present invention is not limited to the structures of the above embodiments, but includes various modifications not departing from the scope of the claims.

Example

An example of the pick-up style utility vehicle 1 relating to the screen assembly 5 will be described.

Figure 20:
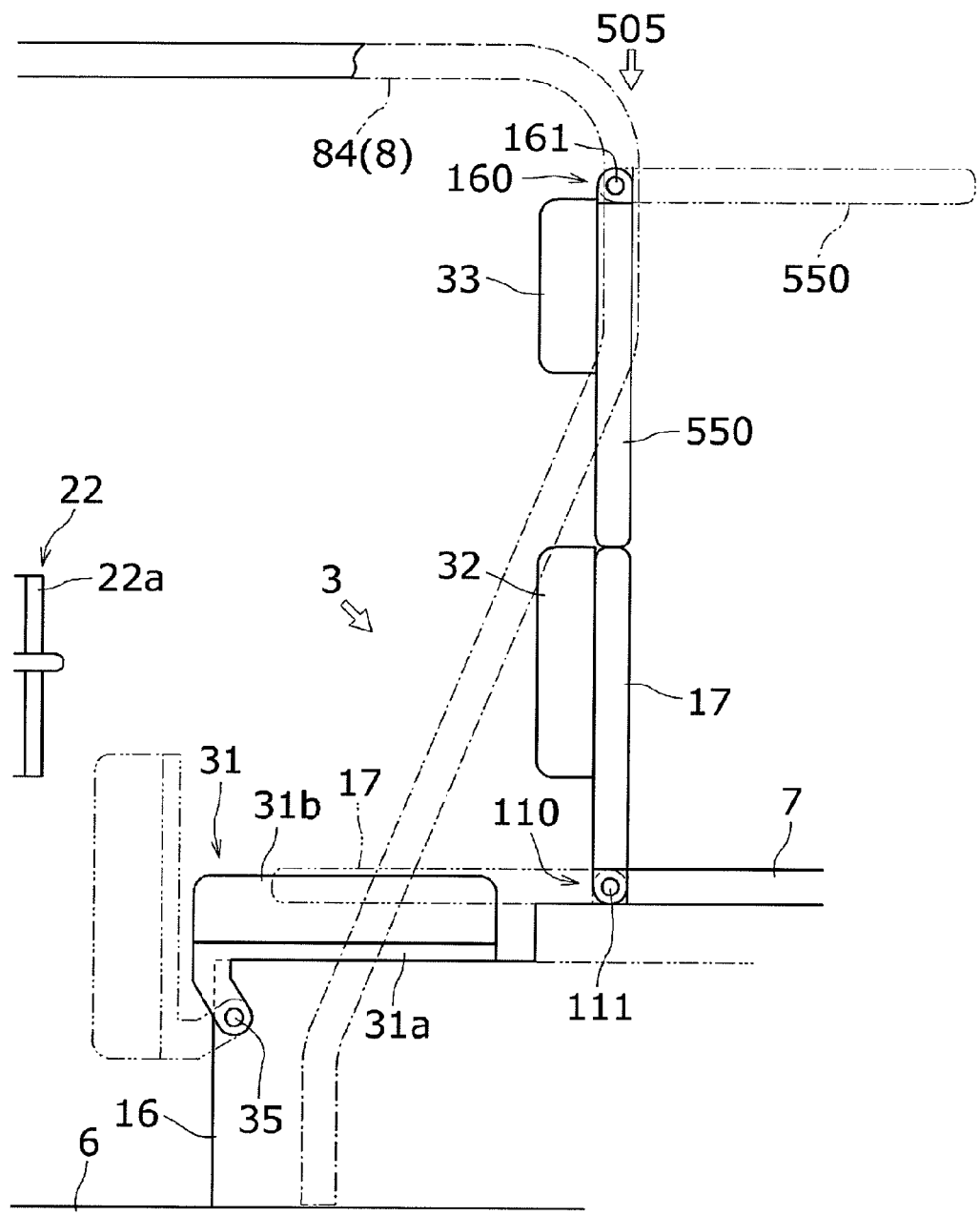
FIG. 20 is a side view showing a screen assembly (an example)
Figure 21:
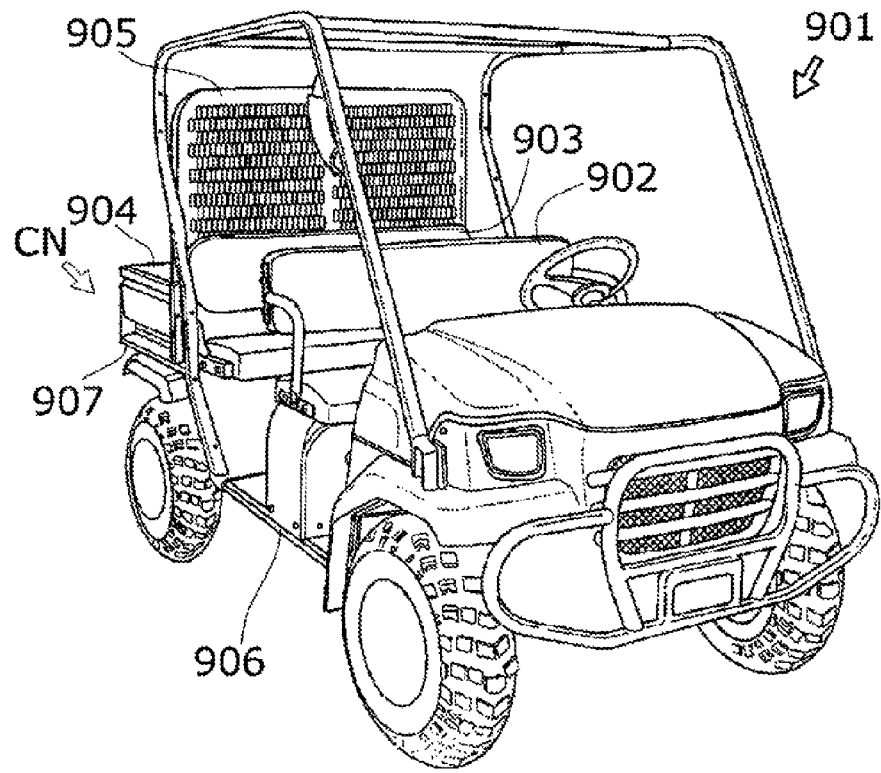
FIG. 21 is a perspective view showing a pick-up style utility vehicle (the related art)
Figure 22:
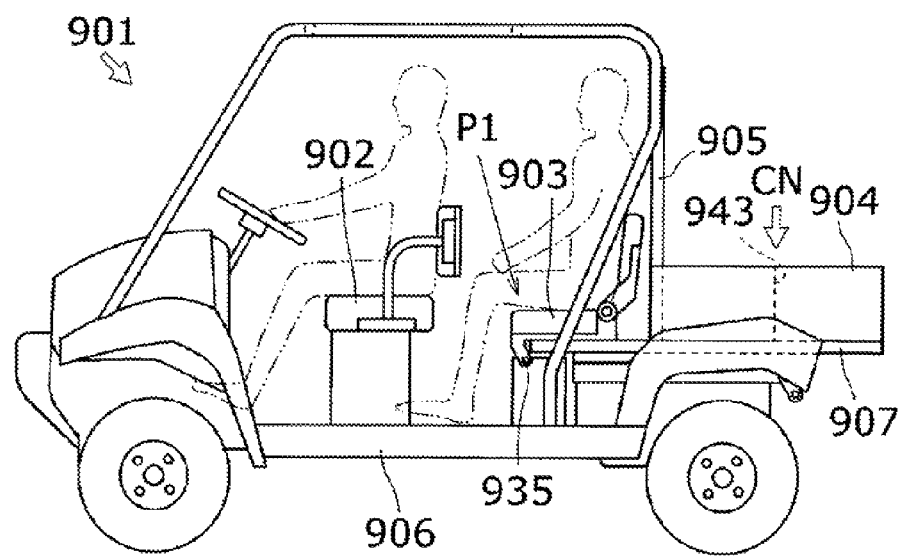
FIG. 22 is a side view showing the pick-up style utility vehicle in the non-expanded state (the related art)
Figure 23:
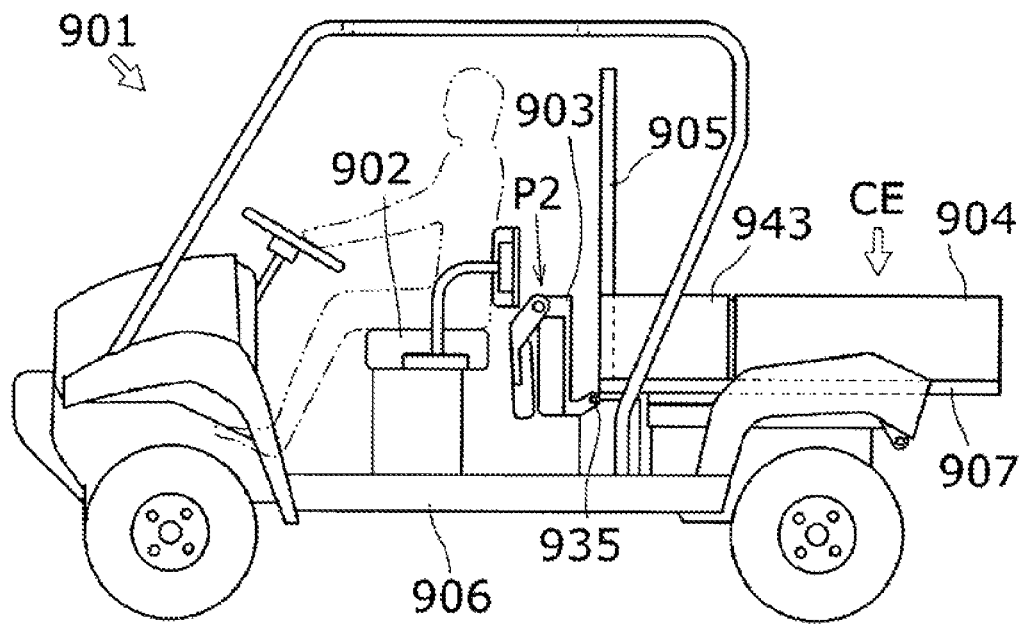
FIG. 23 is a side view showing the pick-up style utility vehicle in the expanded state (the related art)
Figure 24:
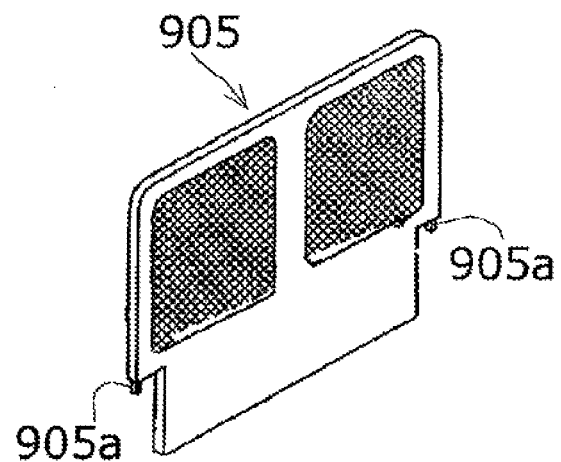
FIG. 24 is a perspective view showing a screen (the related art).

FIG. 20 is a side view showing a screen assembly 505. In the example, parts which are common to the first embodiment will be denoted by the same reference numerals. Description of positional relationships in the example is based on the posture in the non-expanded state (a solid line part).

The screen assembly 505 is provided with a roof plate 550 in an upper part, the expansion bottom plate 17 in a lower part, the first rotary support mechanism 110, and a sixth rotary support mechanism 160. The roof plate 550 and the expansion bottom plate 17 are not connected to each other. The sixth rotary support mechanism 160 supports the roof plate 550 pivotably on a horizontal shaft 161 in the right and left direction relative to the cabin frame 8 (the L shape member 84).

In FIG. 20, the roof plate 550 and the expansion bottom plate 17 in the non-expanded state are shown by the solid line. The roof plate 550 and the expansion bottom plate 17 serve as the screen for closing the front side of the cargo bed CN in the non-expanded state.

In FIG. 20, the roof plate 550 and the expansion bottom plate 17 in the expanded state are shown by a double chain line. Upon a change from the non-expanded state to the expanded state, the roof plate 550 is lifted up rearward, and the expansion bottom plate 17 is brought down forward. The roof plate 550 in the expanded state serves as a roof of the cargo bed CE in the expanded state. The roof plate 550 in the expanded state is also utilized as a shelf.

What is claimed is:

1. A pick-up style utility vehicle, comprising:
   a front seat, a rear seat, and a cargo bed in order from a front side to a rear side of the vehicle; and
   a screen for partitioning the cargo bed and a ride space on a front side of the cargo bed, wherein
   the cargo bed has at least a stationary bottom plate and an expansion bottom plate, the cargo bed being changeable between an expanded state where the cargo bed is expanded forward into the ride space and a non-expanded state where the cargo bed does not occupy the ride space,
   the expansion bottom plate is pivotable on a horizontal shaft extending in the right and left direction of the vehicle, the expansion bottom plate being pivotable relative to the stationary bottom plate,
   in the non-expanded state, the expansion bottom plate standing up and the screen function as a screen for closing the front side of the cargo bed, and
   in the expanded state, the expansion bottom plate is brought down forward such that the expansion bottom plate and the stationary bottom plate serve as a bottom face of the cargo bed.

2. The pick-up style utility vehicle according to claim 1, further comprising:
   a rear support stand arranged on the front side of the stationary bottom plate for supporting the rear seat, wherein the rear support stand is adapted to support the expansion bottom plate in the expanded state.

3. The pick-up style utility vehicle according to claim 2, further comprising:
   a backrest of the rear seat fixed to the expansion bottom plate,
   wherein the rear support stand is adapted to store the expansion bottom plate and the backrest in the expanded state.

4. The pick-up style utility vehicle according to claim 1, wherein the rear seat is supported on the expansion bottom plate.

5. The pick-up style utility vehicle according to claim 1, further comprising:
   an expansion side plate supported pivotably on a vertical shaft relative to the screen for expanding a side plate of the cargo bed in the expanded state.

6. The pick-up style utility vehicle according to claim 5, further comprising:

a fixing mechanism capable of fixing the screen in the non-expanded state and the expansion side plate in the expanded state to the cargo bed.

7. The pick-up style utility vehicle according to claim 1, further comprising:

a fixing mechanism for a shaft capable of fixing the screen to the expansion bottom plate by connecting the expansion bottom plate and the screen in both the non-expanded state and the expanded state.

8. The pick-up style utility vehicle according to claim 1, further comprising:

an expansion side plate provided on a lower side of the rear seat in the non-expanded state pivotably on a horizontal shaft in the back and forth direction for expanding a side plate of the cargo bed in the expanded state.

* * * * *